US008080894B2

(12) United States Patent
Rourke

(10) Patent No.: US 8,080,894 B2
(45) Date of Patent: Dec. 20, 2011

(54) WAVE POWERED ELECTRICAL GENERATOR

(75) Inventor: Gerald S. Rourke, Madison, CT (US)

(73) Assignee: Gerald S. Rourke, Madison, CT (US)

( * ) Notice: Subject to any disclaimer, the term of this patent is extended or adjusted under 35 U.S.C. 154(b) by 0 days.

(21) Appl. No.: 13/088,121

(22) Filed: Apr. 15, 2011

(65) Prior Publication Data

US 2011/0193348 A1    Aug. 11, 2011

Related U.S. Application Data

(60) Division of application No. 12/963,512, filed on Dec. 8, 2010, now Pat. No. 8,018,084, which is a continuation-in-part of application No. 11/718,967, filed as application No. PCT/US2005/040357 on Nov. 8, 2005, now Pat. No. 7,872,365.

(51) Int. Cl.
*F03B 13/12* (2006.01)

(52) U.S. Cl. ................. 290/53; 290/52; 60/507

(58) Field of Classification Search .......... 290/42, 290/43, 52, 54; 60/505, 507
See application file for complete search history.

(56) References Cited

U.S. PATENT DOCUMENTS

| | | | | |
|---|---|---|---|---|
| 3,912,938 A * | 10/1975 | Filipenco | | 290/53 |
| 4,207,739 A * | 6/1980 | Scarpi | | 60/398 |
| 4,242,593 A | 12/1980 | Quilico et al. | | |
| 4,389,843 A | 6/1983 | Lamberti | | |
| 4,408,455 A | 10/1983 | Montgomery | | |
| 4,434,375 A * | 2/1984 | Taylor | | 290/53 |
| 4,480,966 A | 11/1984 | Smith | | |
| 4,883,411 A | 11/1989 | Windle | | |
| 5,066,867 A * | 11/1991 | Shim | | 290/53 |
| 5,359,229 A * | 10/1994 | Youngblood | | 290/53 |
| 5,424,582 A * | 6/1995 | Trepl et al. | | 290/53 |
| 5,808,368 A * | 9/1998 | Brown | | 290/53 |
| 5,889,336 A | 3/1999 | Tateishi | | |
| 7,315,092 B2 * | 1/2008 | Cook | | 290/53 |
| 7,319,278 B2 * | 1/2008 | Gehring | | 290/53 |
| 7,474,013 B2 | 1/2009 | Greenspan et al. | | |
| 7,683,500 B2 * | 3/2010 | Greenspan et al. | | 290/53 |
| 7,737,572 B2 * | 6/2010 | Welch et al. | | 290/53 |
| 7,759,813 B2 * | 7/2010 | Fujisato | | 290/53 |
| 7,872,365 B2 * | 1/2011 | Rourke | | 290/53 |

OTHER PUBLICATIONS

Hagerman, "Wave Energy Resource Primer", p. A-3, Appendix A to "Wave Energy Resource and Economic Assessment for the State of Hawaii", Final Report, Jun. 1992 (www.state.hi.us/dbedt/ert/wave92/).

(Continued)

*Primary Examiner* — Nicholas Ponomarenko
(74) *Attorney, Agent, or Firm* — Birch, Stewart, Kolasch & Birch, LLP

(57) ABSTRACT

A wave powered electrical generator includes: a floating unit that floats in water and accommodates a power generator therein. The floating unit has a wave power system that includes, a chamber containing fluid, a free-floating mass provided in the chamber that separates the chamber into first and second chambers defined at each side of the mass, a first valve that allows the fluid in the first chamber to be discharged from the first chamber as the free-floating mass moves toward the first chamber, and a second valve that allows the fluid in the second chamber to be discharged from the second chamber as the free-floating mass moves toward the second chamber. The fluid discharged through the first and second valves flows into a pipe that discharges the received fluid from an end thereof against a turbine attached to a power generator.

2 Claims, 27 Drawing Sheets

OTHER PUBLICATIONS

Hagerman, George, Southern New England Wave Energy Resource Potential, p. 3, 2001, (www.ctcleanenergy.com/investment/S_New_Engl_Wave_Energy_Resource_Potential.pdf).
www.eia.doe.gov/neic/brochure/elecinfocard.html.
www.ndbc.noaa.gov/stndesc.shtml.
www.ndbc.noaa.gov/Tour/wirtr4.shtml, published Sep. 9, 2004.
www.poemsinc.org/industry.html.
www.sierraclub.org/globalwarming/cleanenergy/introduction.

* cited by examiner

WAVE POWERED ELECTRICAL GENERATOR

This application is a Divisional of application Ser. No. 12/963,512, filed on Dec. 8, 2010 now U.S. Pat. No. 8,018,084, which is a Continuation-in-Part of application Ser. No. 11/718,967, filed on Feb. 11, 2008 now U.S. Pat. No. 7,872,365, which is a National Phase of PCT International Application No. PCT/US05/40357 filed on Nov. 8, 2005, all of which are hereby expressly incorporated by reference into the present application.

BACKGROUND OF THE INVENTION

1. Field of the Invention

The present invention is directed to a wave powered electrical generator utilizing the power of ocean waves to generate electricity in commercial quantities to help reduce global warming.

2. Description of the Related Art

Global warming is the change in the earth's climate resulting from greenhouse gasses emitted into the atmosphere primarily by the burning of fossil fuels. The principal cause of global warming is the generation of electricity by coal, oil and natural gas fired power plants. Worldwide, these fossil fuel power plants produce about 60% of all greenhouse gas emissions (www.sierraclub.org/globalwarming/cleanenergy/introduction). Domestically, such plants account for over 70% of the electricity generated in the United States (www.eia.doe.gov/neic/brochure/elecinfocard.html). If nuclear powered plants, whose radioactive waste will remain a danger to humanity for up to ten thousand years, are included, some 90 percent of the electricity generated in the US (id.) is produced by means which are a threat to the environment and the human race.

One answer to global warming is clean energy, the development of commercially viable methods of generating electricity which do not rely upon fossil or nuclear fuel. Among the sources of clean energy are hydroelectric, wind, solar, geothermal, methane and hydrogen technologies. But there is no question that the greatest potential source of clean energy on Earth is the power of ocean waves. Tapping just two-tenths of one percent of the energy available from the oceans would satisfy the current global demand for electricity (www.poemsinc.org/industry.html). This wave powered electrical generator is a new means of utilizing the power of ocean waves to generate electricity in commercial quantities.

SUMMARY OF THE INVENTION

One aspect of the present invention is directed to a wave powered electrical generator that includes: a first floating unit that accommodates a power generator therein and adapted to float in water, a second floating unit adapted to float in the water in the vicinity of the first floating unit; and a spring line, one end of which being attached to the second floating unit and the other end of which being operatively connected to the power generator, such that a relative movement between the first floating unit and the second floating unit causes the spring line to rotate a shaft of the generator and generate electrical power.

Other aspects of this invention will be readily appreciated as the same become better understood by reference to the following detailed description when considered in connection with the accompanying drawings.

BRIEF DESCRIPTION OF THE DRAWINGS

The drawings are not to scale. The present invention will become more fully understood from the detailed description given hereinbelow and the accompanying drawings which are given by way of illustration only, and thus are not limitative of the present invention, and wherein:

FIG. 7($b$) is a drawing inside the sphere showing the operation of the three pulleys on a spring line when the line is being pulled into the sphere and rewound on its spool;

DETAILED DESCRIPTION OF THE INVENTION

First Embodiment

Figure 1:
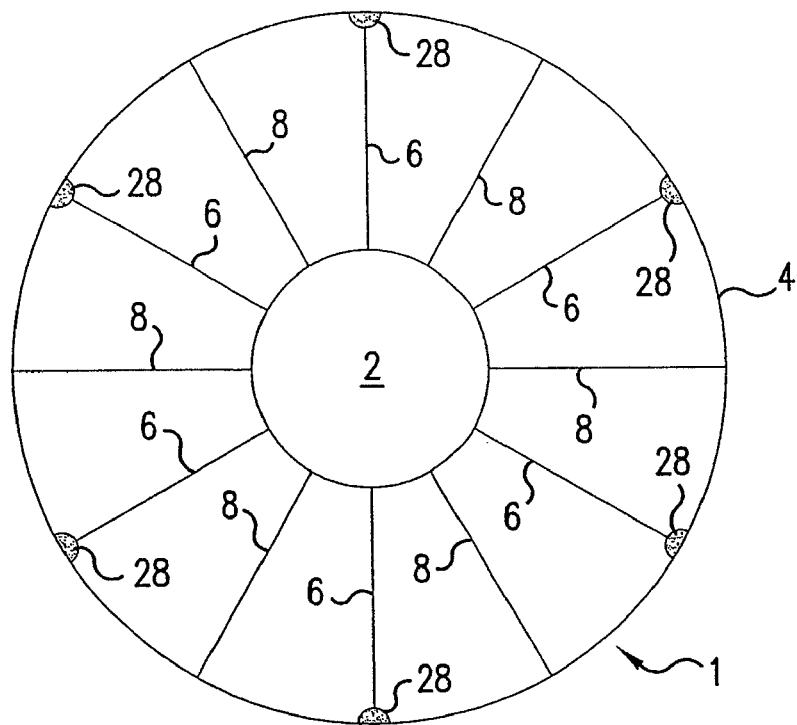
FIG. 1 is an outside view of a sphere and a ring from above, with the sphere in the center of the ring, showing spring lines and slack lines according to the first embodiment of the invention.

The wave powered electrical generator 1 according to the first embodiment of the present invention will be described in detail with reference to FIGS. 1-22.

Sphere and Ring.

As shown in FIGS. 1-4, the first embodiment of the present invention presents itself as a movable sphere 2 (first floating unit) floating about half way down in the water inside a buoyant ring 4 (second floating unit) when viewed from the outside. The optimum distance between the sphere 2 and the ring 4 will have to be determined by testing, but it is believed that when the sphere 2 is in the center of the ring 4, the distance from the sphere 2 to the ring 4 in any direction should be approximately equal to the diameter of the sphere 2. Thus, for example, if the diameter of the sphere 2 is four meters, when the sphere 2 is in the middle of the ring 3, the distance between the sphere 2 and the ring 4 would be four meters all around, so that the diameter of the ring 4 would be twelve meters, i.e., four meters from the ring 4 to the sphere 2, another four meters for the diameter of the sphere 2, and four more meters from the sphere 2 to the ring 4 on the other side. Running between the sphere 2 and the ring 4 are slack lines 6 and spring lines 8 spaced equally around the periphery of the sphere 2. For example, if there are six slack lines 6 and six spring lines 8, they are disposed alternately and spaced about every 30 degrees around the sphere 2. The slack lines 6 are heavier than the spring lines 8.

Sphere

The sphere 2 fully encloses therein, an electric generator portion watertight and airtight approximately half way down in the water. The spherical outside shape will ride well in the water, rising and falling with each passing wave. It will also move in response to any movement of the water. It will offer no flat surfaces to be battered by the waves in a storm, but through buoyancy will simply float on the surface of the water to ride out a storm. It will respond equally well to waves from any direction or several directions at once. No uniformity of wave motion or direction is required for the electric generator to function.

Another advantage of the spherical outside shape is that it will support a substantial amount of weight in the water. The following chart shows the amount of weight which can be supported in the ocean by a sphere of various diameters, from one meter to ten meters. (Column 4, Weight Displaced, is the weight of water at 63 lbs. per cubic foot which would be displaced by the entire sphere, while column 5 is the weight of water which would be displaced by half of the sphere, i.e., by the sphere half way down in the water.)

| Diameter | Radius | Volume (4/3 pi r cubed) | Weight Displaced | ½ Weight Displaced |
|---|---|---|---|---|
| 1M (3.28 Ft.) | 1.64 Ft. | 18.48 Cu. Ft | 1,164 lbs. | 582 lbs. |
| 3M (9.84 Ft.) | 4.92 Ft. | 498.98 Cu. Ft. | 31,435 lbs. | 15,718 lbs. |
| 5M (16.4 Ft.) | 8.2 Ft. | 2,310.23 CuFt. | 145,545 lbs | 72,772 lbs. |

-continued

| Diameter | Radius | Volume (4/3 pi r cubed) | Weight Displaced | ½ Weight Displaced |
| --- | --- | --- | --- | --- |
| 7M (22.96 Ft.) | 11.48 Ft. | 6,339.27 CuFt. | 399,374 lbs | 199,687 lbs. |
| 10M (32.8 Ft.) | 16.4 Ft. | 18,482 Cu. Ft. | 1,164,357 lbs | 582,178 lbs. |

The size of the sphere 4 or spheres 4 to be utilized at any given location in the ocean will depend upon the size of the waves at that location. For the most part, the higher the waves the larger the sphere that can be utilized, and the greater the amount of electricity that will be generated by the generator. Since all that is required for the embodiment to function is relative movement between the sphere 2 and the ring 4 in the water, however, it is believed the generator will function satisfactorily, i.e., generate commercially viable amounts of electricity, in smaller waves as well as larger.

The height of a wave is the vertical distance from the trough to the crest. Because of the variability of ocean waves the height of the waves at any given location is measured by what is referred to as "average significant wave height" which is defined as the average height of the highest one-third waves. (See, e.g., *Southern New England Wave Energy Resource Potential*, p. 3, George Hagerman, 2001, found at www.ctcleanenergy.com/investment/SNew_Engl_Wave_Energy_Resource_Potential.pdf). Thus the annual average significant wave height at any geographical location in the ocean will be of significance for the wave powered electrical generator of the present embodiment because it will influence the range of generator sizes utilized at that location.

There is a practical limitation on the size of the sphere 2 which can be utilized at any given location in the ocean, that limitation being a wavelength, or the distance between two successive significant wave crests. The reason for this limitation is simple: if the diameter of the sphere 2 exceeds the wavelength the sphere 2 will straddle two waves and lose much of its movement. In deep water, wavelength is directly proportional to wave period squared, the period being the time between significant wave crests. (See Hagerman, "Wave Energy Resource Primer", p. A-3, Appendix A to "Wave Energy resource and economic Assessment for the State of Hawaii", final report, June 1992, found at www.state.hi.us/dbedt/ert/wave92/). In Hagerman's Primer, wave period is in seconds and wavelength is in meters. By this analysis, for example, a wave period of five seconds results in a wavelength of approximately 25 meters.

Figure 5:
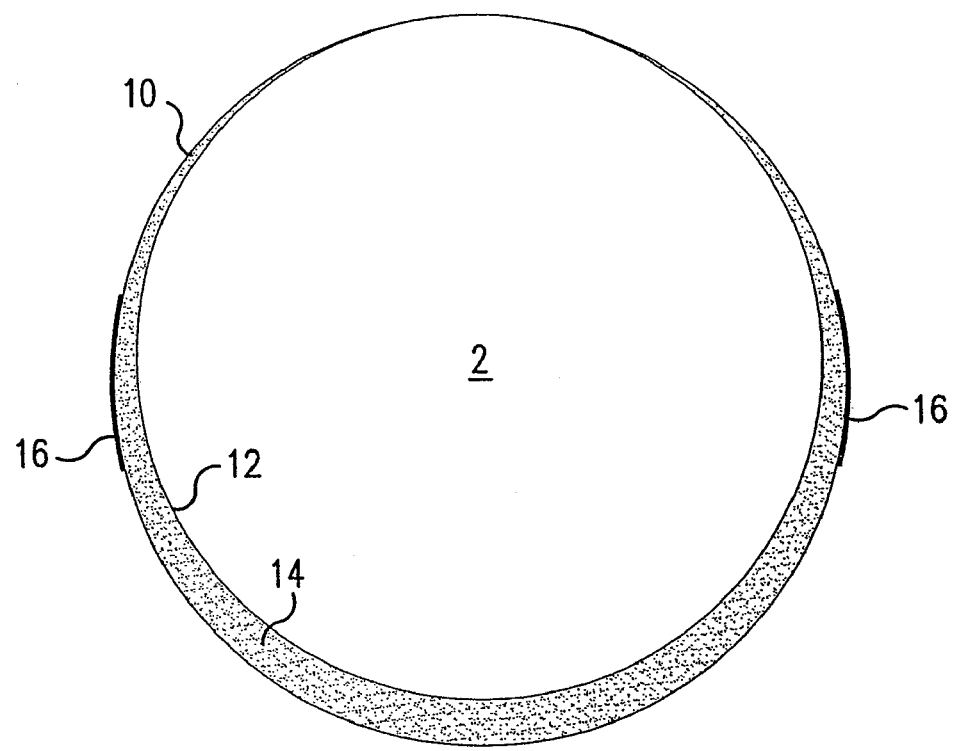
FIG. 5 is a cross-sectional view of a reinforced sphere showing a belt and a structural rib reinforcing the outer shell.

As shown in FIG. 5, the sphere 2 should be constructed of two shells 10, 12 connected to each other, an outer shell 10 that will be exposed to the ocean and an inner shell 12 to which the operating parts of the invention will be fastened. The outer shell 10 should be made of a plastic or metal or composite material, as impervious as possible to the injurious effects of salt water and the various kinds of organisms, sea creatures and debris which are encountered in an ocean environment.

Because the sphere 2 will be an ocean going vessel and subject to powerful waves and storms, the outer shell 10 should be reinforced with ribs 15 on the inside placed approximately every five degrees around its circumference. The ribs 14 should be wider at the bottom of the sphere 2 where there will be greater water pressure and narrower at the top which will usually be out of the water. There should also be a reinforced belt 16 on midsection around the middle of the outer shell 10, both above and below the equator, to absorb and spread the force of the slack lines yanking on the sphere 2 when they tighten.

The inner shell 12 should be made of a lightweight but strong plastic or composition material to which the brackets for the pulleys, gearboxes, stanchions and other parts, which will be described later in detail, can be attached. Both outer and inner shells 10, 12 should be made of non-conducting materials. To open the sphere 2 to facilitate access to the working parts of the generator the sphere 2 should be split into top and bottom hemispheres.

Ring

The function of the ring 4 is to create tension on the spring lines 8 when the sphere 2 moves or rolls or the ring 4 moves in the ocean waves. To accomplish this, the ring 4 needs to be buoyant and relatively rigid. What matters is that the ring 4 be large enough and heavy enough to remain in its place relative to the sphere 2 and put a strain on the spring line 8 when the sphere 2 moves or the ring 4 moves.

Figure 2:
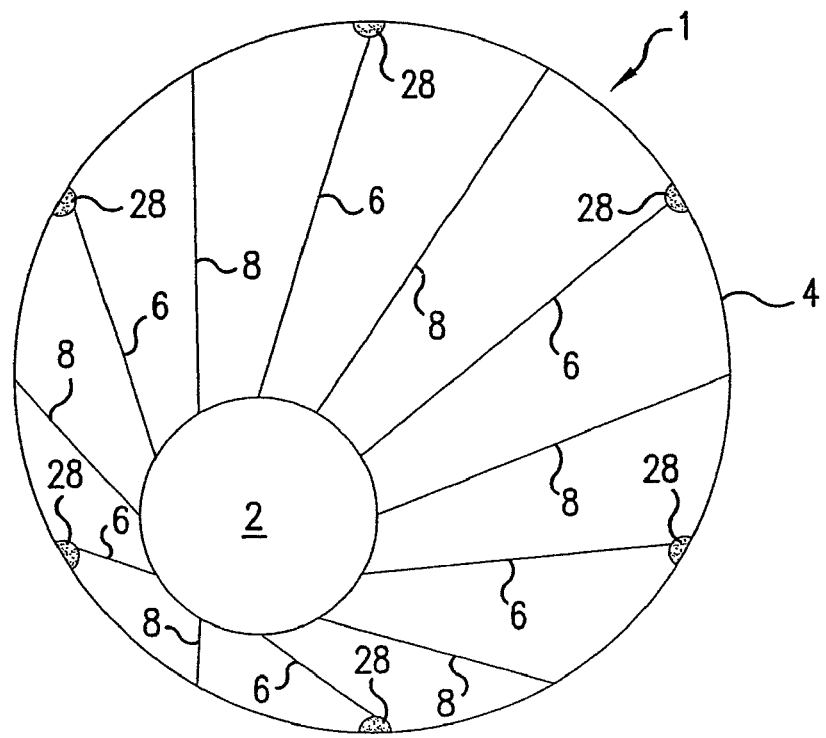
FIG. 2 is an outside view of the sphere and ring from above, with the sphere off-center in the ring, showing spring lines and slack lines.
Figure 3:
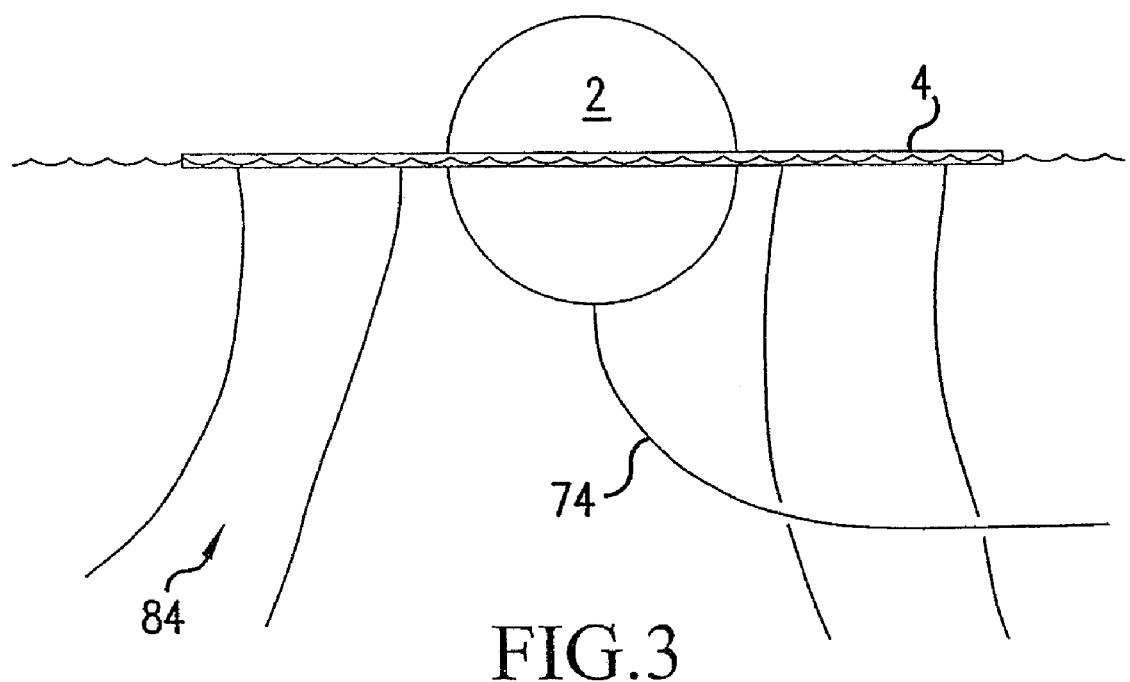
FIG. 3 is an outside view of the sphere and ring from the side, with the sphere in the center of the ring, showing a transmission line and a ring anchoring system.
Figure 4:
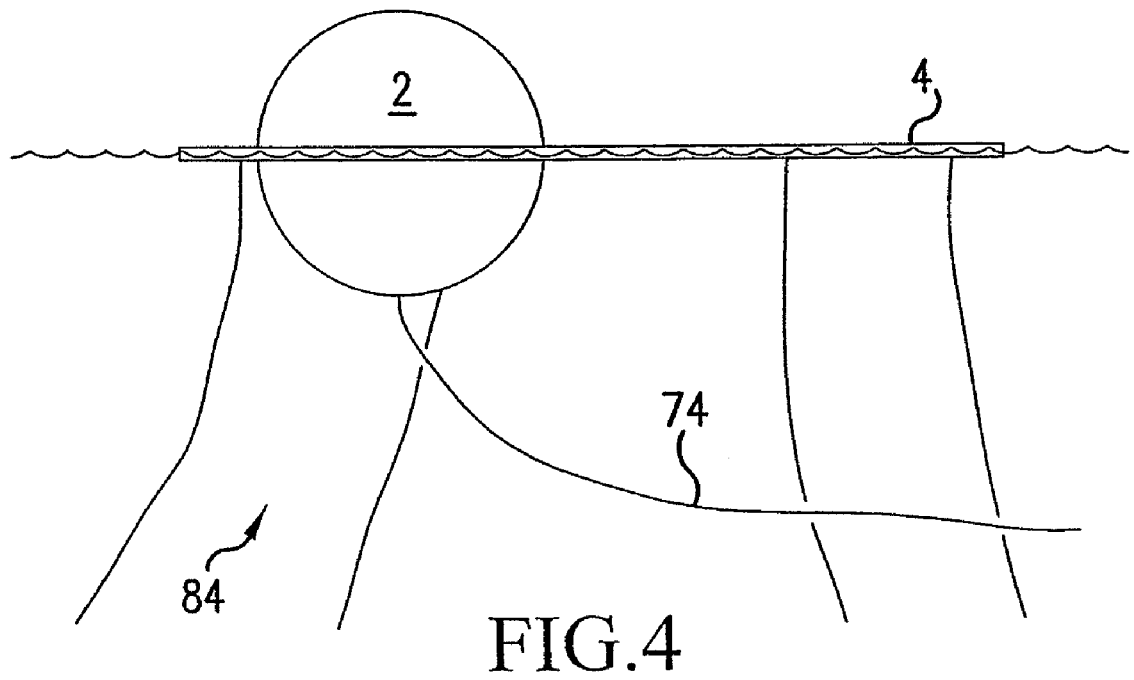
FIG. 4 is an outside view of the sphere and ring from the side, with the sphere off-center in the ring, showing the transmission line and the ring anchoring system.

The ring 4 shown in FIGS. 1 and 2 is circular in shape. The ring, however, need not be a perfect circle, but could consist of a ring of logs 18 tied or chained together to surround the sphere 2, such as is shown in FIG. 3. The ring 2 can also be made of a relatively lightweight but strong and rigid plastic or composite material and could be constructed in airtight and watertight sections of arc of 60 degrees each, for example. In that case the sections would have rings or eyes built into them to connect to the spring lines 8 and the slack lines 6, and would be interchangeable. The sections could have a male connection at one end and a female connection at the other so that any six of them could be joined together to make a complete circular ring.

Spring Lines

In order for the generator to generate electricity, the relative movement of the sphere 2 and ring 4 in the waves must be turned into pressure, and the pressure must be transmitted to a wheel inside the sphere. One way of doing this is by the spring line 8 running from the ring 2 across to the sphere 2 and then through both the outer and inner shells 10, 12 of the sphere 2 at the equator, the approximate water line, to a system of pulleys, belts, and gears inside the sphere 2, which would turn the wheel. What the optimum arrangement of spring lines, pulleys, belts, and gears is to turn the wheel will be determined by testing. What follows is an illustrative configuration to indicate the requirements of the system.

Figure 7A:
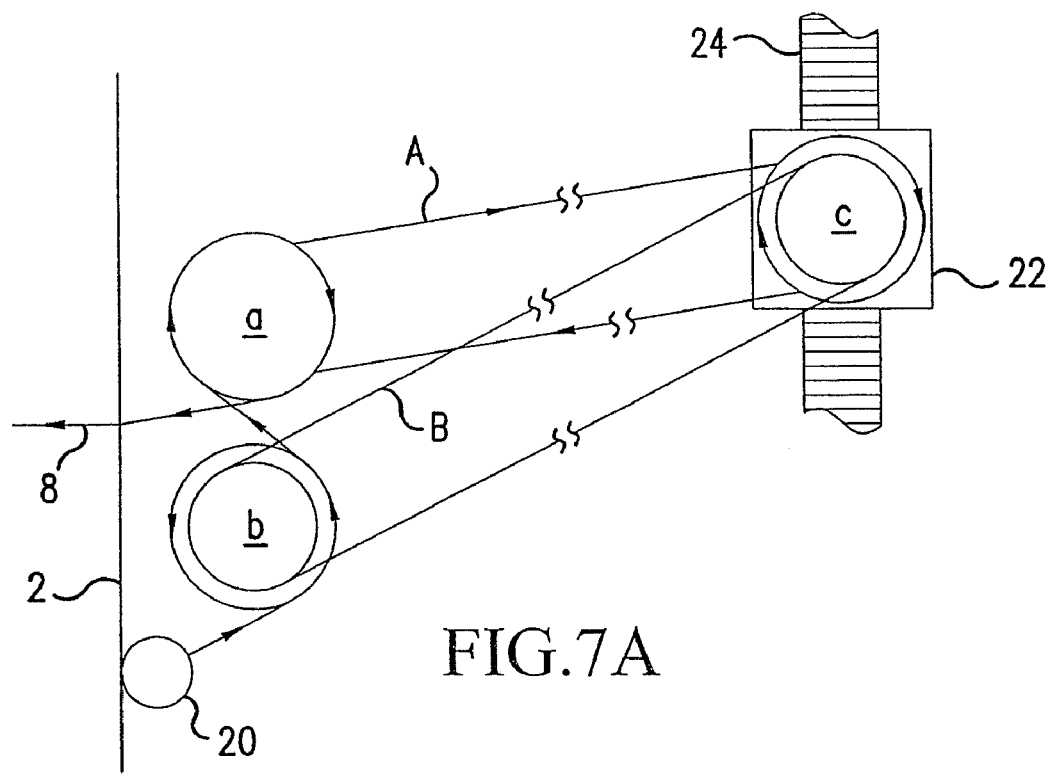
FIG. 7($a$) is a drawing inside the sphere showing the operation of three pulleys on a spring line when the line is being pulled out of the sphere.
Figure 7B:
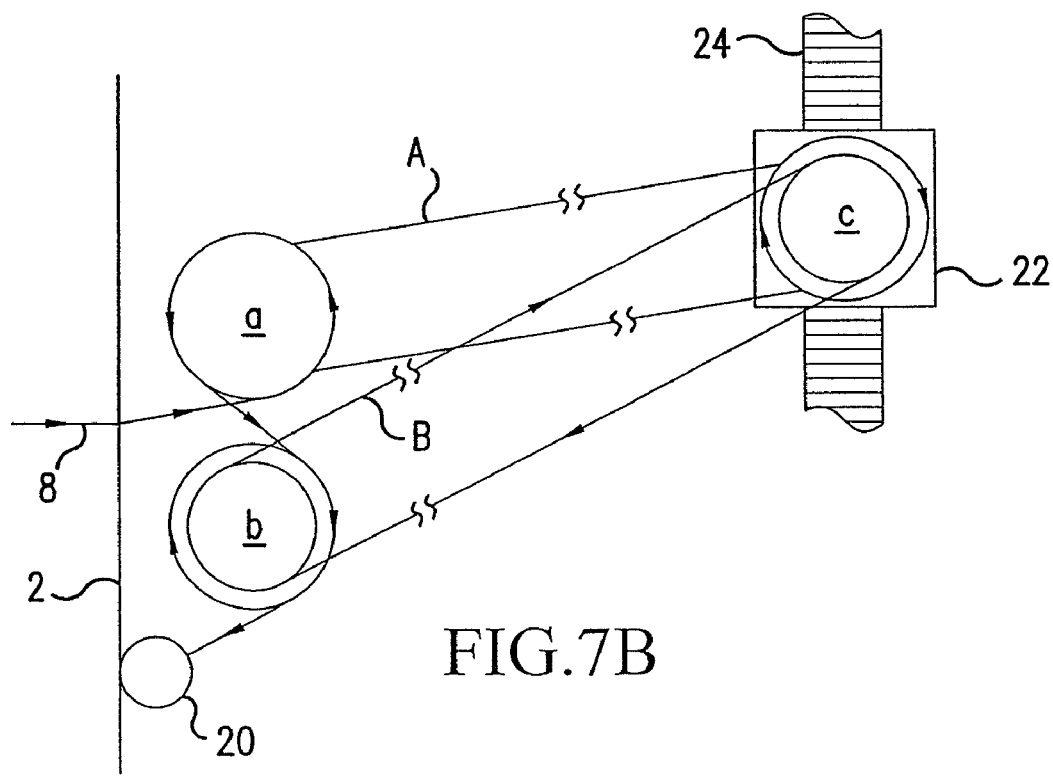
Figure 8:
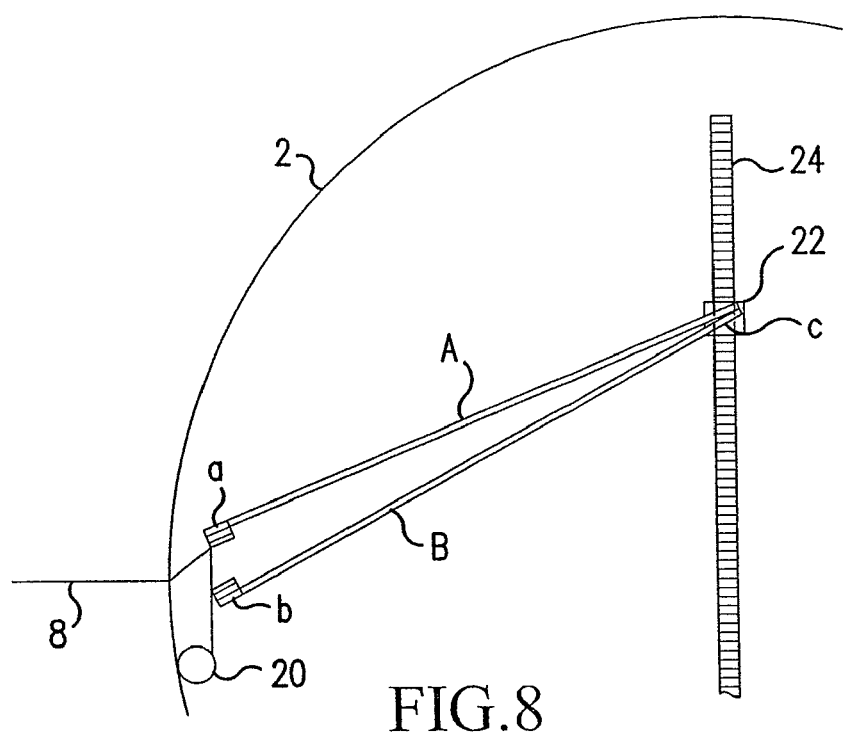
FIG. 8 is a cross sectional view inside the sphere showing a spring line pulley system and wheel gearbox.

More specifically, as shown in FIGS. 7 and 8, the spring line 8 is fastened at one end to the ring 4 (not shown) and runs across to the sphere 2 where it passes through a watertight opening in the side of the sphere 2 and runs to a first pulley a mounted on the inside of the sphere 2. The spring line 8 wraps around the first pulley a and then runs to a second pulley b which it wraps around in the opposite direction, runs to a spool 20 on a spring and then is fastened to the side of the sphere 2. These two pulleys a and b, which shall be called the "outer pulleys," have belts A, B, respectively, on their other side which run to a third pulley c, the "inner pulley," which turns a gear in a gearbox 22, which turns the wheel 24.

Figure 9:
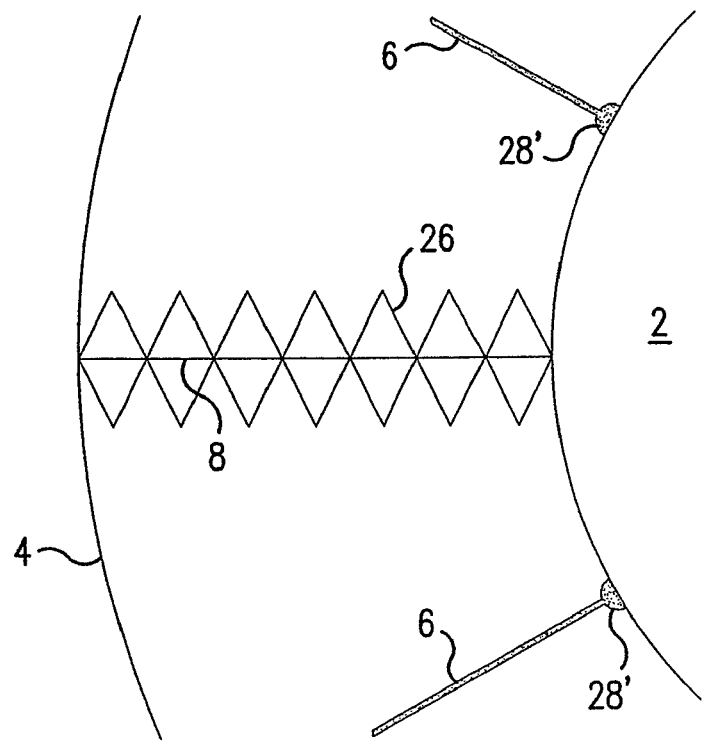
FIG. 9 is an outside view of a spring line and slack lines from above, showing optional slack line spools at the sphere and spring line accordion cover.

The spring lines 8 are made of strong but flexible material, hemp, metal, plastic or a combination, and outside the sphere 2 may be placed inside an accordion-like cover 26 which expands and contracts as the spring line 8 moves in and out of the sphere 2 as shown in FIG. 9. The purpose of the cover 26 is to keep the spring line 8 dry and free of seaweed and other things floating in the water. The spring line 8 itself may have holes in it spaced so as to correspond to teeth or spikes on the outer pulleys to prevent slippage of the line 8 on the pulleys.

The operation of a spring line 8 and its three pulleys a-c and belts A, B is shown in FIGS. 7 and 8. The arrangement is such that the spring line 8 will turn the outer pulleys both when it is being pulled out of the sphere 2 by the pressure of the ring 4, and when it is being pulled back into the sphere 2 by the pressure of the spring on the spool 20. Also, the arrangement is such that the pulley at the gearbox 22 on the wheel 24, the inner pulley, will turn in the same direction whether the spring line 8 is being pulled out of the sphere 2 or is being pulled back into the sphere 2. Thus the wheel 24 will be spun in the same direction at all times so as to generate a continuous flow of electricity as long as there is movement of the waves.

The end of the spring line 8 inside the sphere 2 is attached to the spool 20 which is under the pressure of a spring. As the spring line 8 is pulled out, the spring is tightened, so that when the pressure on the spring line 8 is released the spring rewinds the line on the spool 20 inside the sphere 2. That rewinding of the spring line 8 on its spool 20 turns the second pulley b and its belt B, which turns the inner pulley at the gearbox 22 and turns the wheel 24. There is a mechanical or electronic cut-out which disengages each of the outer pulleys while the other outer pulley is activated to turn the inner pulley at the gearbox 22.

Slack Lines

The function of the slack lines 6 shown in FIGS. 1 and 2 is to permit the sphere 2 to move freely inside the ring 4 in any direction but to prevent the sphere 2 and ring 4 from colliding with each other. In a smaller version of the generator, there may be an equal number of spring lines 8 and slack lines 6 alternating around the equator of the sphere 2. Thus for example, with a three or four meter diameter sphere 2, there might be twelve lines, six spring lines 8 alternating with six slack lines 6, with one line placed every 30 degrees around the circle. In a larger version of the generator, for example, one with an eight or ten meter diameter sphere, there might be twice as many lines, with perhaps sixteen or eighteen spring lines 8 and six or eight slack lines 6, with a line placed every 15 degrees around the circle.

Each slack line 6 is connected to the ring 4 at one end and to the equator of the sphere 2 at the other end. The length of each slack line 6 is 80 or 90 percent of the maximum distance between the ring 4 and the sphere 2. Thus, for example, in the case of the sphere 2 and ring 4 shown in FIGS. 1-4, which are four meters apart all around when the sphere 2 is in the middle of the ring 4, the maximum distance between the sphere 2 and the ring 4 would be 8 meters (i.e., when the sphere 2 is touching the ring), so each slack line 6 would be about 7½ meters long. This slack line 6 will begin to take pressure gradually when the sphere is about 1 meter from the ring 4 and will become taut so as to prevent further movement in that direction when the sphere 2 reaches a point about a half meter from the ring 4.

Figure 6:
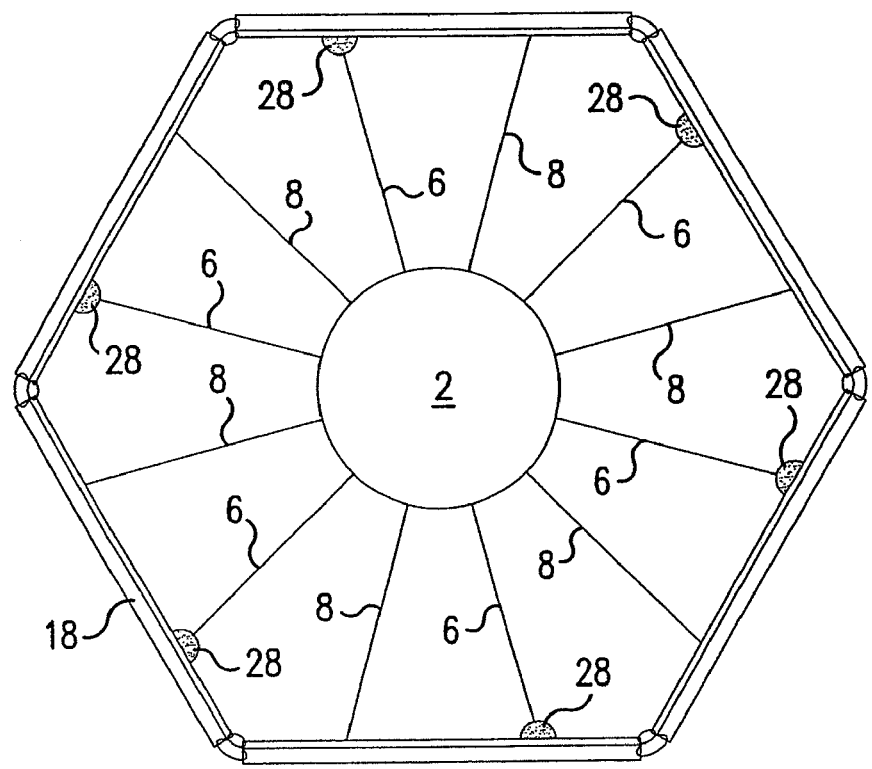
FIG. 6 is an outside view of the sphere and a ring made of logs rather than a round circle, showing spring lines and slack lines.

The slack lines 6 are made of heavy duty material, hemp, nylon or other plastic, or chain or a composite specially designed for extra tensile strength in order to be able to withstand the pressures which will be applied by the movement of the sphere 2 away from the ring 4 at the point where the slack line 6 is attached to the ring 4. As shown in FIGS. 1, 2, and 6, each slack line 6 has a spool 28 at one end with a spring attached, but unlike the spring line 8, the slack line spring is under only slight pressure, enough to rewind the slack line 6 if it is not under pressure, but not enough to prevent the slack line 6 from playing out easily when the ring 4 and the sphere 2 are not at or close to their maximum separation. Thus, the only time the slack line 6 will take pressure away from the spring lines 8 is when the slack line 6 is almost fully extended and the slack line 6 takes the pressure to prevent the sphere 2 from colliding with the ring 4. Once the slack line 6 takes the pressure and draws its side of the ring 4 closer to the sphere 2, it will again slack off and allow the spring lines 8 to take the pressure. As shown in FIG. 9, a spool 28' may be provided at the end of each slack line 6 at the sphere 2, instead of at the other end.

Pulley, Belt, and Gear System

The function of the pulleys, belts, and gear system is to transmit to the wheel 24 the pressure applied to a spring line 8 by the movement of the sphere 2 in the waves relative to the ring 4, or the movement of the ring 4 relative to the sphere 2. Each spring line 8 is fastened to the ring 4 at one end and runs across the intervening distance to the sphere 2 where it enters the sphere 2 through a watertight opening at the equator of the sphere 2. Inside the sphere 2, as shown in FIGS. 7 and 8, the spring line 8 winds around one side of the first pulley a which is fastened to the inner shell 12 of the sphere 2, and then winds in the opposite direction around one side of the second pulley b which is also fastened to the inner shell 12 of the sphere 2. From the second pulley b, the spring line 8 runs to a spring loaded spool 20 around which it is wound. The end of the spring line 8 is fastened to the inner shell 12 of the sphere 2 at or near the spool 20.

Figure 10:
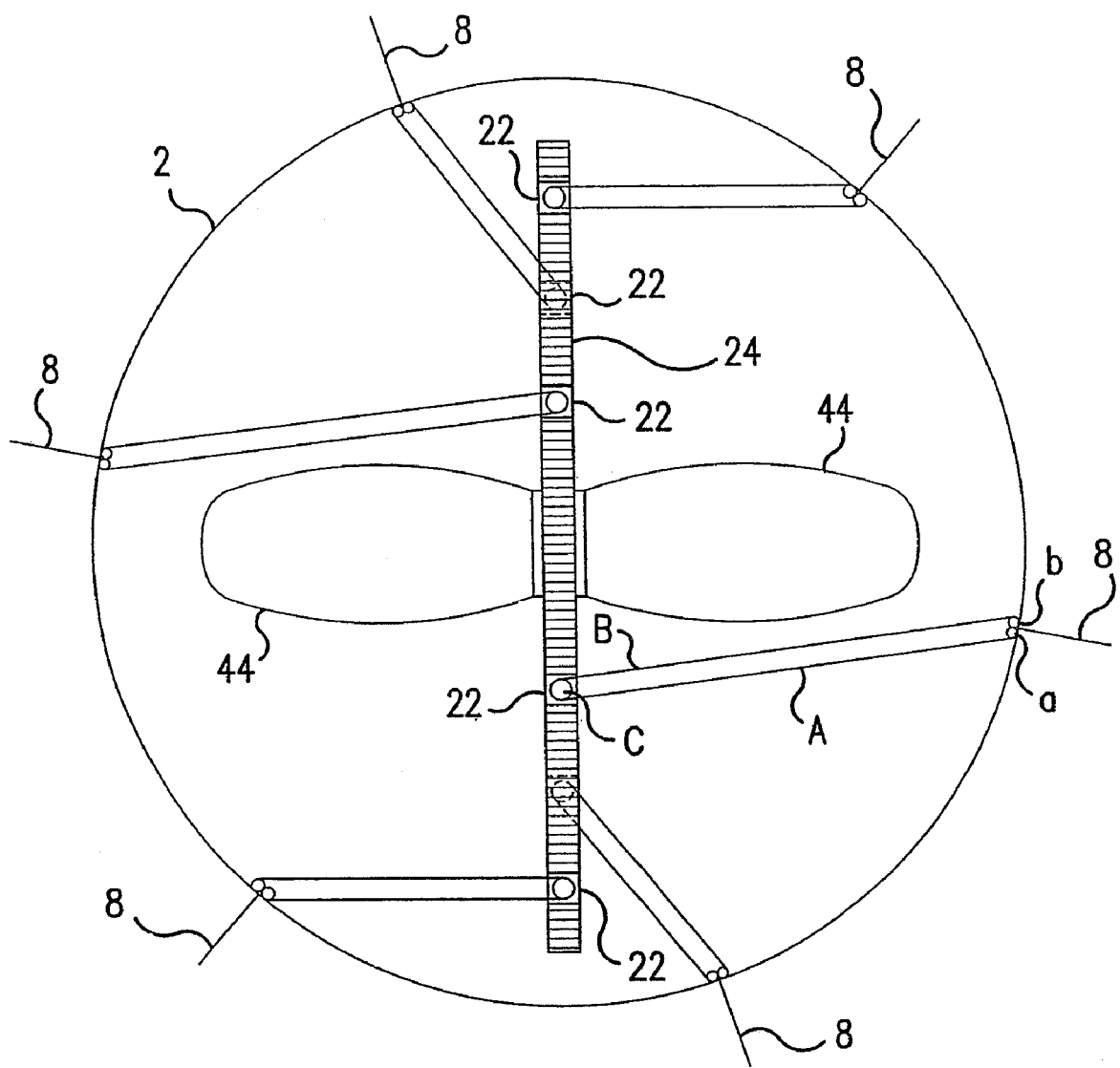
FIG. 10 is a cross sectional view inside the sphere from the top showing spring lines, pulleys, belts, wheel, wheel gearboxes and nacelles.
Figure 11:
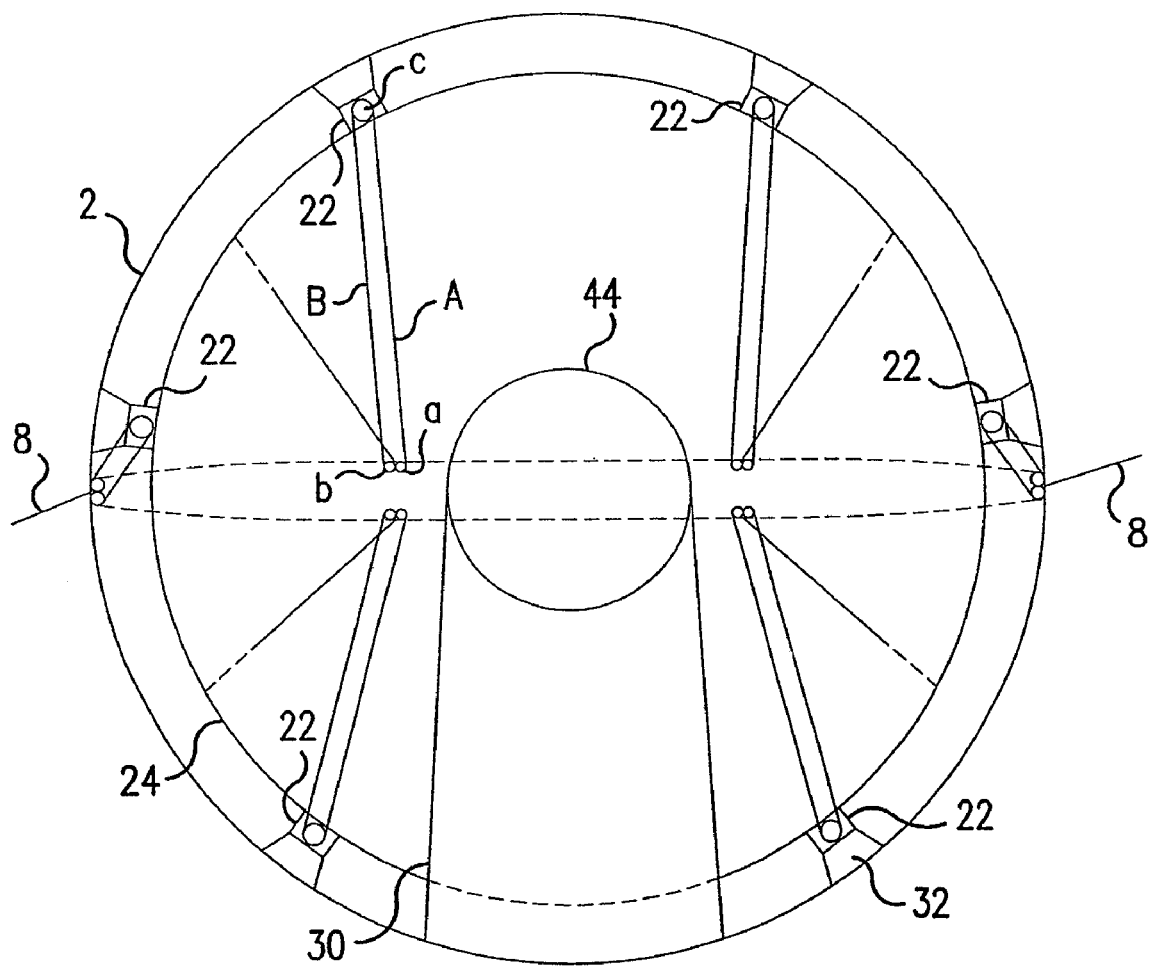
FIG. 11 is a cross sectional view inside the sphere from the side showing a nacelle and its stanchion end-on, and the wheel, with spring lines, pulleys, belts, and wheel gearboxes.
Figure 12:
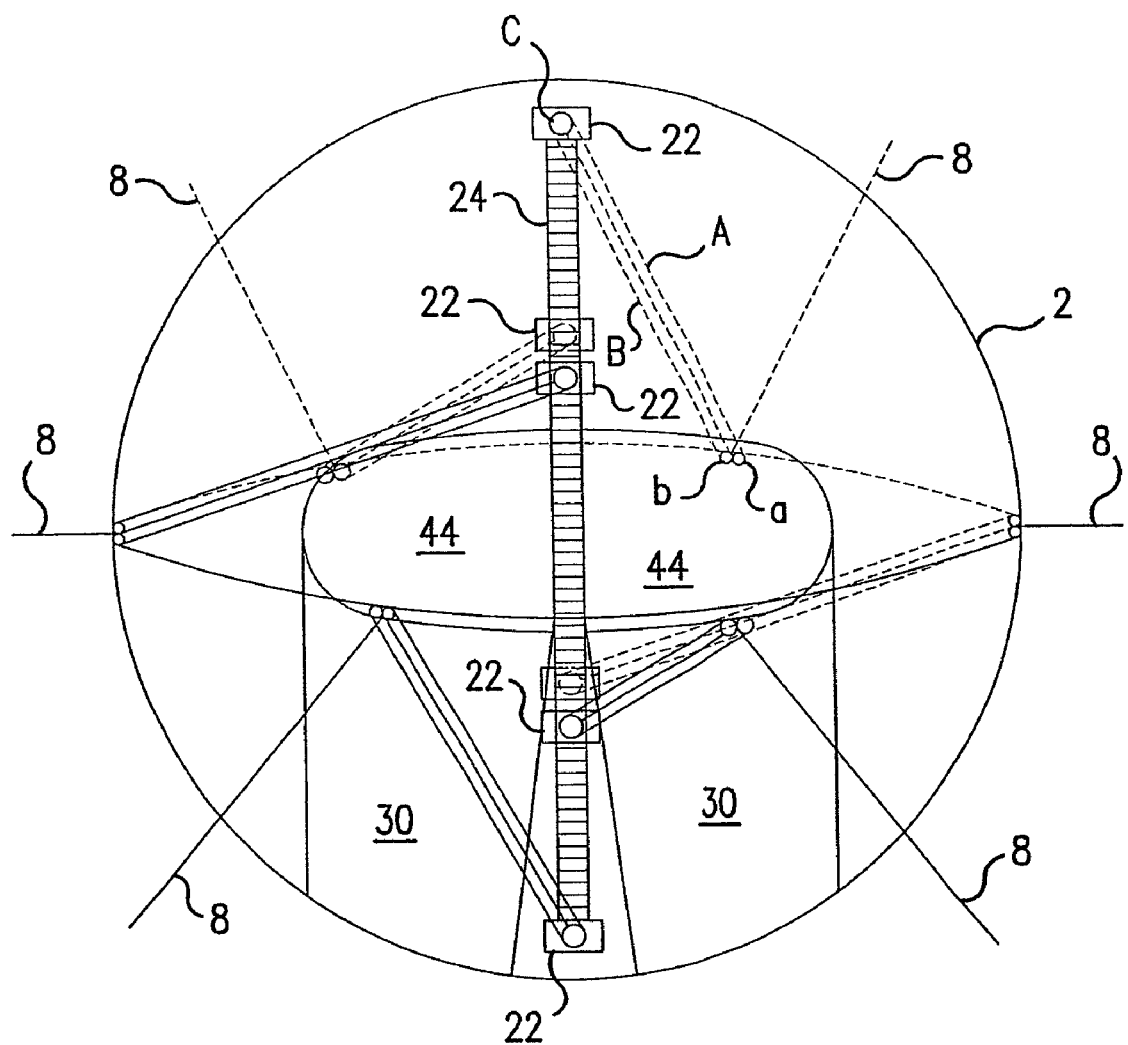
FIG. 12 is a cross sectional view inside the sphere from the side showing the nacelles, their stanchions and the wheel, with spring lines, pulleys, belts and wheel gearboxes.

As shown in FIGS. 7(a), 7(b), and 8 as well as FIGS. 10-12, each of the outer pulleys (a, b) is a double pulley and has the spring line 8 wrapped around one side and a belt (A, B) around the other side. The belt runs from the outer pulley to a third pulley c at the periphery of the wheel 24, called the inner pulley. This inner pulley is also a double pulley and has the belt (A, B) from one of the outer pulleys on one side and the belt from the other outer pulley on its other side.

When the spring line 8 is pulled, it turns the two outer pulleys it is wrapped around, and each of these pulleys turns the belt wrapped around its other side. The belts stretch to the inner pulley whose shaft is connected to the gearbox 22 whose teeth of an output gear in the gearbox 22 mesh with teeth on the periphery of the wheel 24, so that when the output gear turns, its teeth turn the wheel 24 (collectively referred to as a gear system). A mechanical or electronic cut-out is employed on each of the outer pulleys so that the outer pulley's belt will turn the inner pulley only when the inner pulley is turning in the proper direction.

What type of a gear will be employed at the inner pulley will depend upon several factors, including the location of the outer pulleys relative to the inner pulley. This will depend upon which spring line 8 is paired with which gearbox location around the periphery of the wheel 24. The plane of the equator of the sphere 2 and the plane of the wheel 24 are at right angles to each other. Each spring line 8 and its outer pulleys is in a different position vis-à-vis its inner pulley from each of the other spring line-pulley combinations, and few, if any, of these positions will be at a right angle to its inner pulley, so in each instance the gear at the periphery of the wheel 24 will probably need to be a hypoid bevel gear, or another type of gear that can engage with the axes in different planes.

As shown in FIGS. 1 and 2, whatever number of spring lines 8 is utilized, the spring lines 8 are equally spaced around the periphery of the equator, so as to assure that movement of the sphere 2 or ring 4 in any direction will be transmitted to the wheel 24. The inner pulleys and gearboxes 22 at the periphery of the wheel 24, however, will not necessarily be equally spaced around the wheel 24, because, as shown in FIG. 11, stanchions 30 in the lower part of the sphere 2 may obstruct access to the lower part of the wheel 24 from some directions. Thus, it is likely that more of the inner pulleys and gearboxes 22 will need to be located on the upper half of the wheel 24 than the lower half. This will not have any adverse affect on the spinning of the wheel 24. Note that the gearbox 22 shown in FIG. 11 is attached to the sphere via a gearbox bracket 32.

Figure 13:
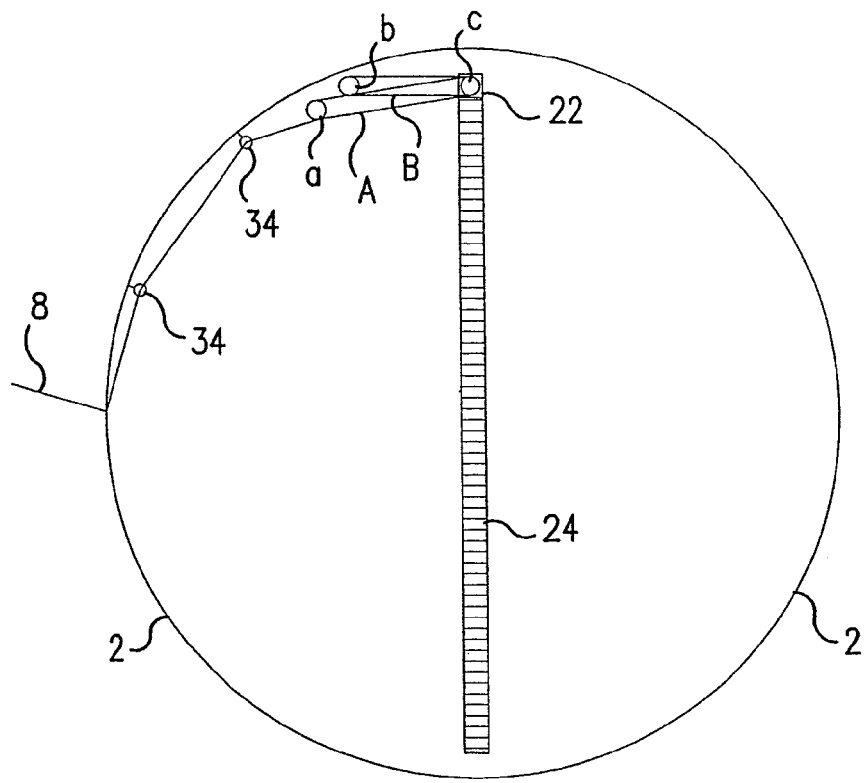
FIG. 13 is a drawing of a variation showing a spring line extended by screw eyes with outside pulleys located nearer the wheel.

One variation of the arrangement discussed above would be to have the spring line 8 run farther into the sphere 2 in the direction of its wheel 24 and gearbox 22, with the spring line 8 passing through a series of screw eyes 34 mounted in the inner shell 12 of the sphere 2, to its outside pulleys located at a point closer to the wheel 24 as shown in FIG. 13. The advantage of such an arrangement would be that the belts would be much shorter and would not need to run in a straight line from the equator of the sphere 2 all the way to the periphery of the wheel 24. Running the spring lines 8 along the shell of the sphere 2 to the vicinity of the wheel 24 would also free up much of the space inside the sphere 2 for other uses. This variation shown in FIG. 16 utilizes such arrangement for a single spring line, but it could be applied to all of the spring lines.

Wheel and Low-Speed Shaft

Figure 14:
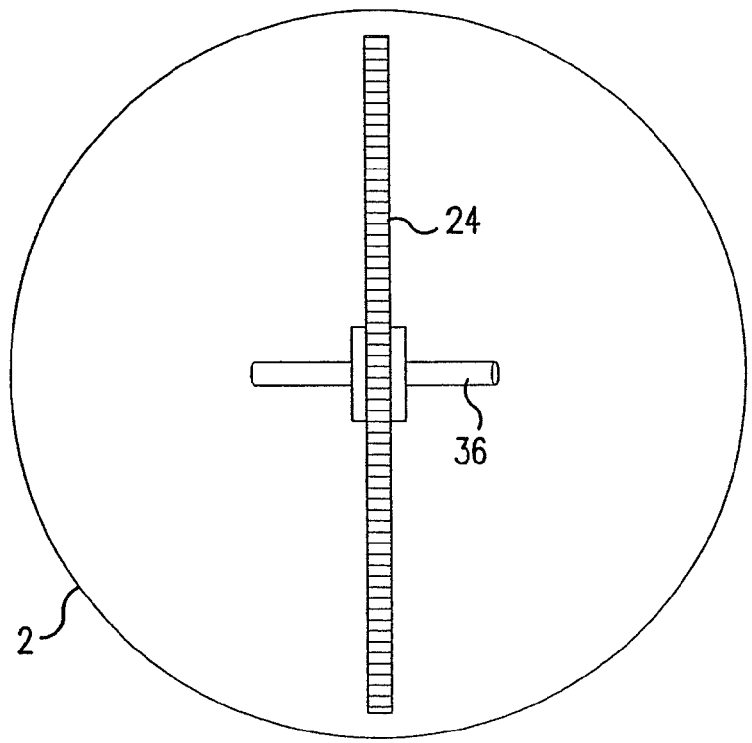
FIG. 14 is a cross sectional view inside the sphere showing only the wheel and a low-speed shaft.

As shown in FIG. 14, a low-speed shaft 36 is attached to the wheel 24. The function of the wheel 24 and the low-speed shaft 36 is to receive the pressure applied to the spring lines 8 by the relative motion of the sphere 2 and ring 4 in the ocean waves in the form of a spinning motion imparted by the pulley and gear systems, and transmit that spinning motion through another gearbox 22 to turn a high-speed shaft in two or more generators. As shown in FIG. 11, the wheel 24 is mounted in the middle of the sphere 2 in order to maximize its size, and the diameter of the wheel 24 will be almost equal to that of the sphere 2, with only the gearboxes 22 between the wheel 24 and the inner shell 12 of the sphere 2. The gearboxes 22 with their accompanying inner pulleys are mounted in the inner shell 12 of the sphere 2 around the periphery of the wheel 24.

When a wind power generator is used as the generator of this embodiment, the wheel 24 takes the place of the rotor blades in a wind turbine and it will need to be made of strong yet relatively light materials. It will need to be able to turn easily yet be strong enough to withstand the centrifugal force that will be applied to it at high rotational speeds. In addition, like all the other parts of the embodiment the wheel 24 will need to be able to operate for long periods of time without requiring frequent maintenance.

Figure 15:
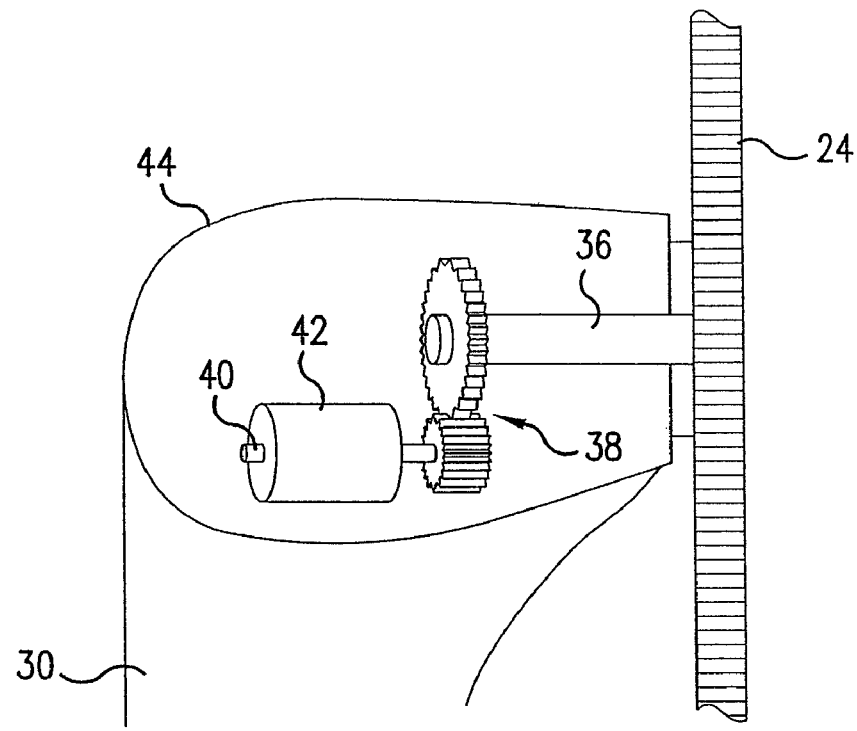
FIG. 15 is a cross sectional side view inside the sphere of a nacelle with one generator, showing the wheel and low-speed shaft, nacelle gearbox, high-speed shaft, and nacelle stanchion.

As shown in FIG. 14, the low-speed shaft 36 is mounted through the center of the wheel 24 and fastened to the wheel 24 to operate as part of a single unit with the wheel 24, spinning as the wheel 24 spins. As shown in FIGS. 14 and 15, the low-speed shaft 36 is connected to a gearbox 38 or 38' at each end with one or more gears to increase the speed of rotation of the high-speed shaft 40 or shafts 40' connected to the other side of each gearbox. The high-speed shaft 40 or shafts 40' turn the generator 42 or generators 42' to generate electricity. While the wheel 24 will need to be designed and constructed specifically for this embodiment, the low-speed shaft 36 may be an off-the-shelf item that can be taken from a nacelle of a wind turbine.

Nacelles and Generators

Figure 16:
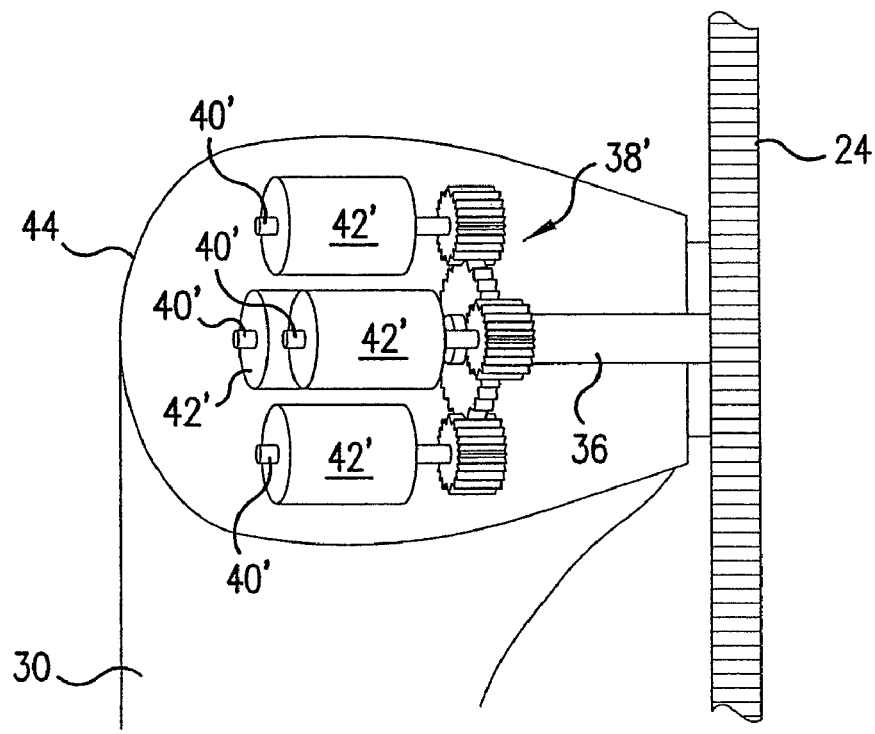
FIG. 16 is a cross sectional side view inside the sphere of a nacelle with four generators, showing the wheel and low-speed shaft, nacelle gearbox, high-speed shafts and nacelle stanchion.

Nacelles 44 and generators 42 and 42' shown in FIGS. 15 and 16 are modified off-the-shelf items taken from wind turbines. Instead of rotor blades to turn the low-speed shaft 36 of a wind turbine, the invention utilizes the wheel 24 for that purpose. The specifically wind-related parts of the wind turbine, such as an anemometer, wind vane, controller, yaw motor, and yaw drive on a tower, are removed. The nacelle 44 with its low-speed shaft 36, gearbox 38, 38', high-speed shaft 40, 40', and generator 42, 42', and disc brake, are utilized by this embodiment. Since the embodiment operates in an enclosed environment, the wind generators utilized will need to be water cooled, not air cooled.

Since the wheel 24 is positioned exactly in the middle of the sphere 2 to maximize the size of the wheel 24 for a given sphere 2, this embodiment mounts a low-speed shaft 36 on both sides of the wheel 24, unlike a wind turbine which mounts a low-speed shaft on only one side of the rotor. With two low-speed shafts to utilize, the invention can mount several different sized generators in a single sphere 2. Thus, for example, in a small sphere, the four small generators rated at say 25 KW can be mounted on one side of the wheel as shown in FIG. 15, and a single larger generator rated at 100 KW can be mounted on the other side as shown in FIG. 14, so that the invention would have the capability of generating electricity in amounts from less than 25 KW to 200 KW, depending upon the ocean state at any given time. In such a configuration mechanical or electronic controls would also be mounted in the nacelle 44 to determine which generator or generators would be activated at any time, or the order in which the generators would come on line. The order will depend upon the speed of rotation of the wheel 24, with first one and then a second, third, and fourth smaller generator coming on line as the wheel speed increases, until the speed is sufficient to operate the larger generator on the other side of the wheel 24. At that point the single larger generator would come on line and the four smaller generators on the other side would cease operating. Thereafter, if the wheel speed continues to mount the smaller generators will once again come on line one by one until all the generators are on line and the system is operating at its full capacity.

In the alternative, two large generators could be mounted in a single sphere and operate together or alternately, depending upon the sea state and the demand for electricity at any given time or season. A wheel with two low-speed shafts offers flexibility in the configuration of generators which a wind turbine does not have.

Nacelle Stanchions

The function of the two Nacelle Stanchions 30 shown in FIG. 12 is to bear the weight of the wheel 24, low-speed shafts 36, and nacelles 44 and to house cooling systems, transmission systems, and controls of this embodiment. As shown in FIGS. 11 and 12, the base of each stanchion 30 is at the bottom of the sphere 2 where it rests upon and is fastened to the inner shell 12 of the sphere 2. The stanchions 30 extend from the bottom of the sphere 2 to the nacelles 44 which are placed slightly below the middle of the sphere 2.

The nacelle stanchions 30 are the load bearing parts and must be strong enough to support the weight of the major operational components. The only components which are not supported by the stanchions are the pulleys and gearboxes 22 which are fastened to the inner shell 12 of the sphere 2 with brackets 32. The load bearing parts of the stanchions 30 will probably need to be constructed of heavy duty steel, while stainless steel or heavy duty aluminum may suffice for the framework and non-load bearing parts. In any event most of the weight will be in the stanchions 30.

Cooling System

Figure 17:
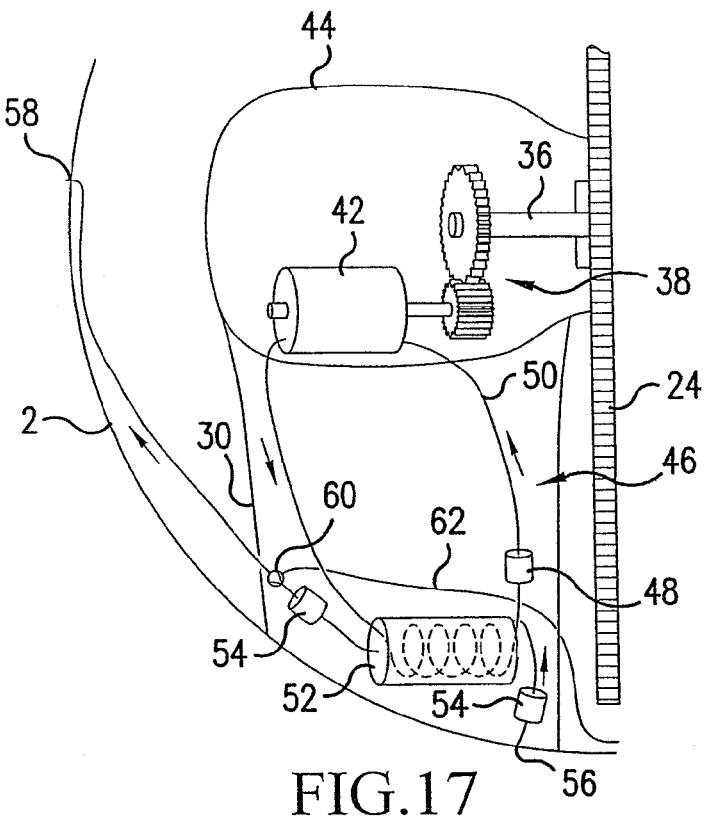
FIG. 17 is a drawing of a generator cooling system showing a heat exchanger.

As shown in FIG. 17, a closed circuit cooling system 46 for the generators 42, which are water cooled, is located in each stanchion. The cooling system 46 utilizes two or three small electrical pumps 48, 54, 54', circulating two separate and distinct coolants, seawater and fresh water. One pump 48, a centrifugal type, circulates fresh water mixed with glycol in plastic tubes 50 which run through and around the windings of the generator 42 or generators 42', then out of the nacelle 44 into the stanchion 30 to a heat exchanger 52 located in the lower part of the stanchion 30. The heat produced by the generator windings is transferred to the fresh water passing through the tubes 50. The second pumps 54, 54', a vane or gear type, suck up seawater and circulate it through the heat exchanger 52 where it cools the fresh water in the plastic tubes 50.

The heat exchanger 52 is a cylinder mounted in the lower part of the stanchion 30. A seawater intake 56 is at the lower part of the sphere 2 and a seawater discharge 58 is located above the equator of the sphere 2 where it will be above the waterline most of the time. Since there will be two cooling systems 46, one in each stanchion 30, the seawater discharges 58 can be located on opposite sides of the sphere 2 and operated in tandem utilizing valves 60, such that if one discharge 58 is underwater at any given time both cooling systems 46 will utilize the other through an alternate discharge line 62, above water, discharge. The two heat exchangers 52 full of seawater near the bottom of the sphere 2, in addition to cooling the tubes of fresh water, will also serve as ballast which will permit the sphere 2 to roll in the waves but will oppose any tendency of the sphere 2 to roll completely over in a storm.

Electrical Transmission System and Controls

Figure 18:
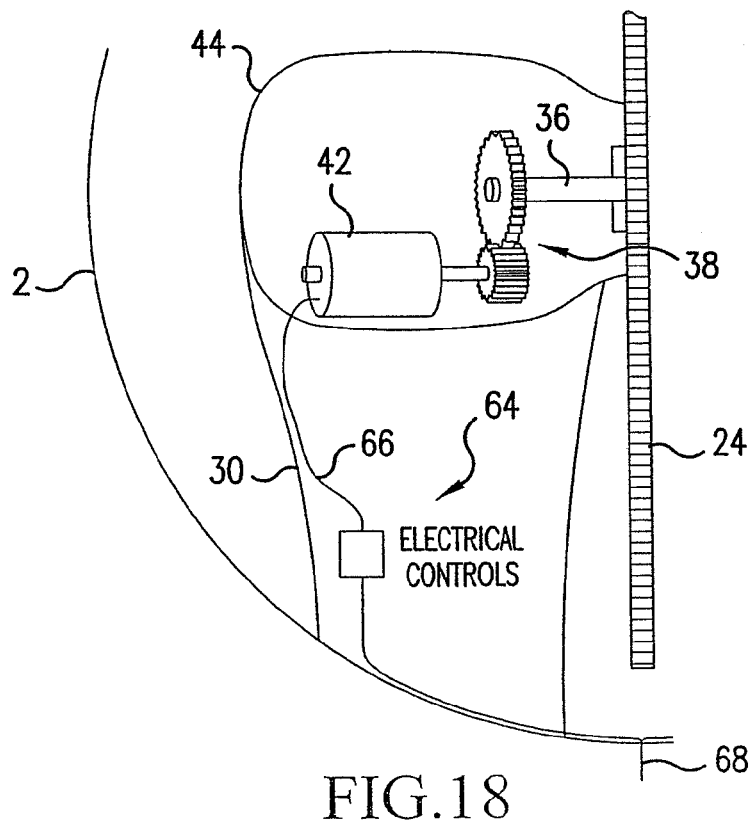
FIG. 18 is a drawing showing the electrical transmission line and electrical controls inside the sphere.
Figure 19:
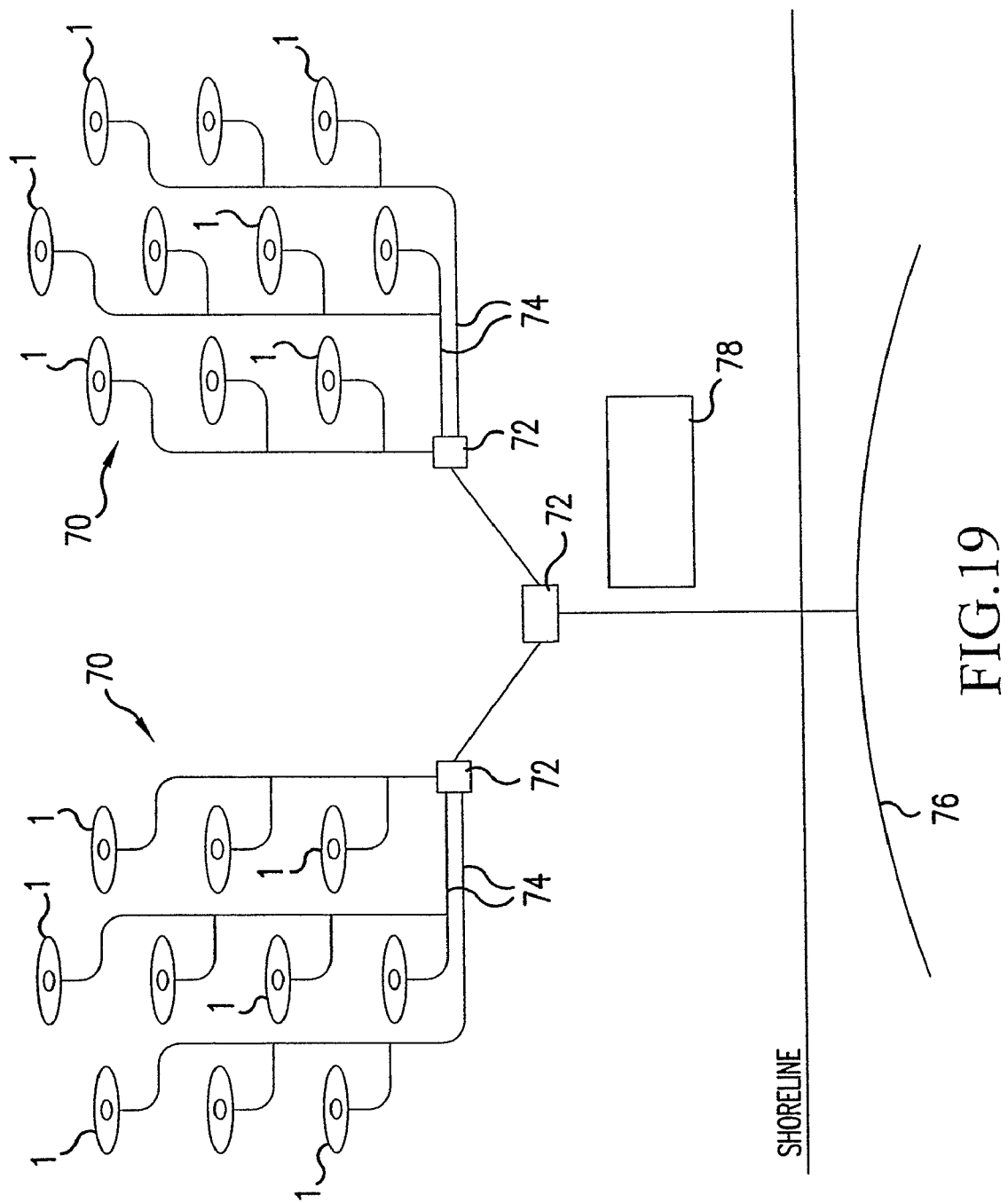
FIG. 19 is a drawing of a typical wave powered generator farm showing the generators, collection points and underwater storage battery pack.
Figure 20:
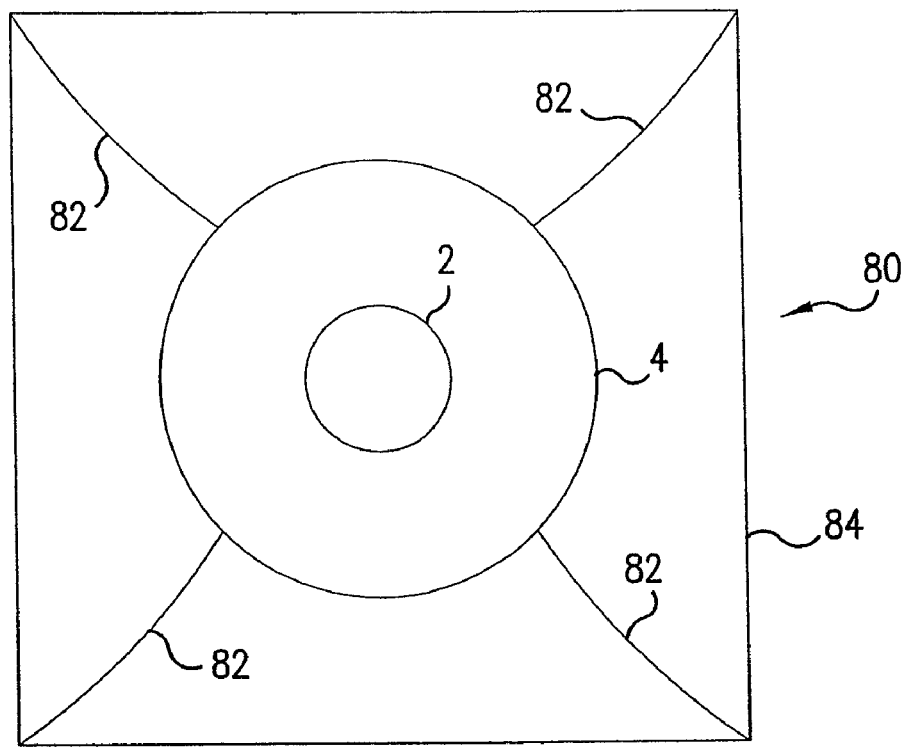
FIG. 20 is an outside view from above the sphere showing the ring anchoring system, with anchor chains and anchoring grid.
Figure 21:
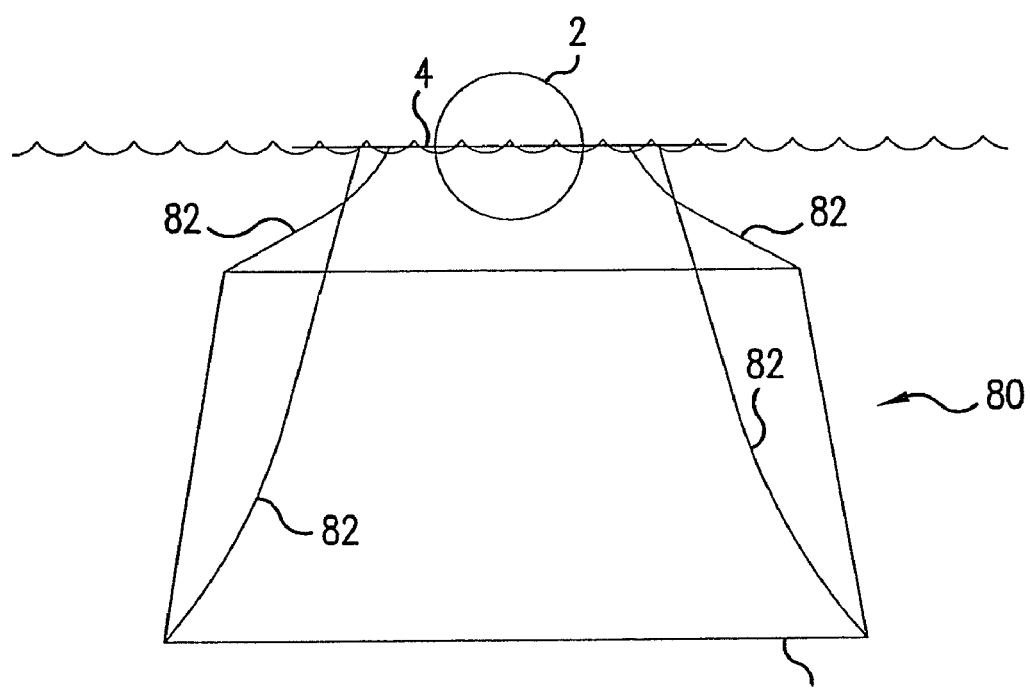
FIG. 21 is an outside side view of the ring anchoring system showing the sphere, ring, anchor chains and anchoring grid.

As shown in FIG. 18, an internal electrical transmission system 64 can also be similar to those used in wind turbines. A transmission line 66 will run from the generator 42 into the nacelle 44 and then into the stanchion 30, through the stanchion 30 to the bottom of the sphere 2 where it will exit the sphere at a transmission line egress 68. As shown in FIG. 19, an external transmission line will be a conventional underwater electrical transmission line and will run to collection points 72 with transmission lines 74 from other wave powered generators 1 in the same generator farm 70, and then to the shore where it will be connected to a local electrical grid 76. Between the collection points 72 and the shore it may be desirable to install an underwater storage battery bank 78, either on the ocean bottom or floating above it, to collect part of the electrical power generated by the system during periods of peak production, and to supplement the power generated during periods of low production, so as to even out the flow of electricity to the grid 76 from the generator farm 70.

Since like any offshore electrical generating system, this system will need to be connected to the electrical grid 76 on land, the closer the generator is located to the shore the shorter the undersea transmission line that will be required, and the lower the cost of transmitting the electricity produced. In some situations there may be tradeoffs between the increased height of the waves farther from shore and the increased cost of longer transmission lines, but it is apparent that the most desirable locations for installing the invention will be where there are sizable waves relatively close to shore, and where the electrical grid 76 is close to the shoreline.

There will be sufficient room in the nacelle 44 or the stanchion 30 for a voltage regulator, a rectifier, and other electrical controls for the generator.

Anchoring System

Since the wave powered electrical generator consists of two separate parts, the sphere 2 and the ring 4, floating in the ocean, connected by flexible lines, there are three possible ways of anchoring the electrical generator: (i) anchor the sphere only, (ii) anchor the ring only, and (iii) anchor both the sphere and the ring. Of these three alternatives, the preferred method is to anchor the ring 4 only, since the operation of the generator depends primarily upon the unfettered movement of the sphere 2 in the ocean waves relative to the ring 4. It is inevitable that anchoring the sphere 2 will reduce the vertical motion of the sphere 2 somewhat, if not the horizontal motion as well, whereas anchoring the ring 4 will only indirectly, and thus not adversely, affect the motion of the sphere 2.

Anchoring the ring 4 might also make it possible to delineate the area of the ocean occupied by the electrical generator. FIGS. 3, 4, 20, and 21 show an anchoring system 80 for anchoring the ring 4. The shape of the ring 4 lends itself to the use of three or four anchoring lines (or chains) 82, for example one line to the north, one to the east, one to the south and one to the west. If these lines are run to the four corners of a square anchoring grid 84 placed in the ocean beneath the power generator, the size of the underwater anchoring grid 84 could effectively define the area of the ocean that will be occupied by the power generator. In addition, multiple anchoring grids 84 connected to each other could be utilized to anchor multiple units of the power generator next to each other in the ocean.

The operation of the power generator depends upon the ring 4 floating at or near the surface of the ocean at all times, so there would need to be enough slack in the anchor lines 82 from the ring 4 to permit the ring to rise and fall with the ocean waves. If the anchoring grid 84 were installed at a predetermined depth of water, perhaps based upon the water pressure at the given depth, the grid 84 would serve as a relatively stable anchoring platform. It would then be necessary to anchor the grid 84 to the ocean floor.

There are a number of existing methods of anchoring objects in the ocean which could be used to anchor the grid 84. Oil rigs and platforms are anchored in virtually all ocean depths using various devices and combinations of devices, several of which could be modified for use with the power generator. Closer in size to the power generators of the present embodiment are the weather data buoys moored in the oceans off the US by the National Data Buoy Center (NDBC). These buoys range in size from 3 meters to 12 meters and are anchored in ocean waters with depths from 13 meters to over 4,500 meters (www.ndbc.noaa.gov/stndesc.shtml). The mooring systems vary depending upon the depth of the water, with all chain systems being used for shallow depths (up to 90 meters) and semi taut nylon for various intermediate depths (60 to 600 meters). For deep ocean moorings there are two systems, a float inverse catenary, which is used from 600 to 6000 meters, and a poly-nylon inverse catenary, which is used from 1200 to 6000 meters (www.ndbc.noaa.gov/Tour/wirtr4.shtml). Rather than utilize one anchor per data buoy as NDBC does, since the anchoring grid referred to above can serve a number of wave powered generators and cover an extended area, it will be more advantageous to utilize at least two anchors, attached to opposite sides of the underwater grid system. A mooring system comparable to that used by the NDBC for its data buoys would seem appropriate for the power generator of the present embodiment.

Capacity

How much electricity the invention will be able to generate is unknown and will have to be determined by testing. It is believed that at any given moment the power generator of the present embodiment will capture the wave energy of the area of the ocean occupied by the sphere, plus the wave energy of the linear circumference of the ring. The area of the ocean occupied by the sphere in this case is the area of the circle comprising the equator of the sphere, pi r squared, r being the radius of the sphere. The linear circumference of the ring is 2 pi r, in this case r being the radius of the ring.

Taking the sphere and ring previously referred to above as an example, where the diameter of the sphere is four meters and the diameter of the ring is twelve meters, the area of the ocean occupied by the sphere is pi r squared, or 3.14×2×2, which equals approximately 12.5 square meters. The diameter of the ring is 12 meters, so its radius is 6 meters, and its circumference is 2×3.14×6 or approximately 37.5 meters. Since we will be dealing in generalities anyway, and it is difficult to deal with both square meters and linear meters, we will use the circumference of the sphere rather than its area, for purposes of this discussion. The circumference of the sphere is 2 pi r, or 2×3.14×2, which equals approximately 12.5 meters. Thus the 4 meter diameter sphere with a 12 meter diameter ring will have a combined circumference of approximately 50 linear meters of ocean waves. Even if the power generator is grossly inefficient, so that it generates only one kilowatt per hour per linear meter of ocean waves captured, a device of this size will generate 50 kilowatts per hour of electricity, which equates to the minimum rating for a commercial wind generator. If the power generator of the first embodiment is even reasonably efficient, it will generate substantially more electricity than that.

The same analysis for a smaller version of the power generator, a three meter diameter sphere with a nine meter diameter ring, for example, results in a combined circumference of over 37 meters. Again, an efficiency of 1 kw per meter results in approximately 37 kw per hour, while only 2 kw per meter would result in approximately 75 kw per hour, a not insignificant figure for a wave powered device.

Second Embodiment

The second embodiment of the wave powered electrical generator 100 which utilizes the present invention will be described with reference to FIGS. 22 and 23.

The wheel utilized in the first embodiment may be excessive relative to the size of the gearboxes in engagement with the wheel. The gearboxes may be forced to turn at an excessive rate of speed to keep up with the very large wheel which they are turning.

Figure 22:
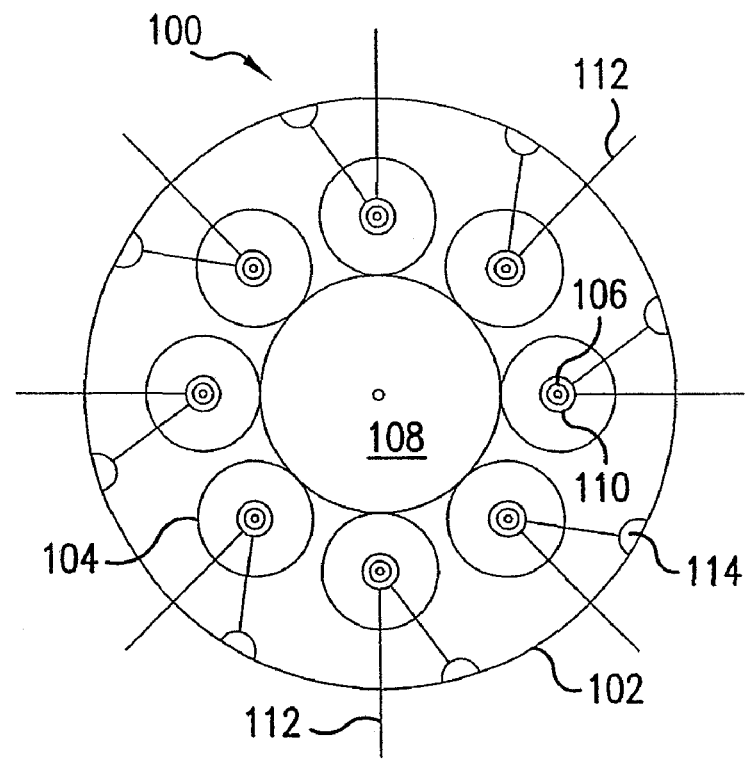
FIG. 22 is a drawing of an inside of the sphere from above, according to a second embodiment of the present application.
Figure 23:
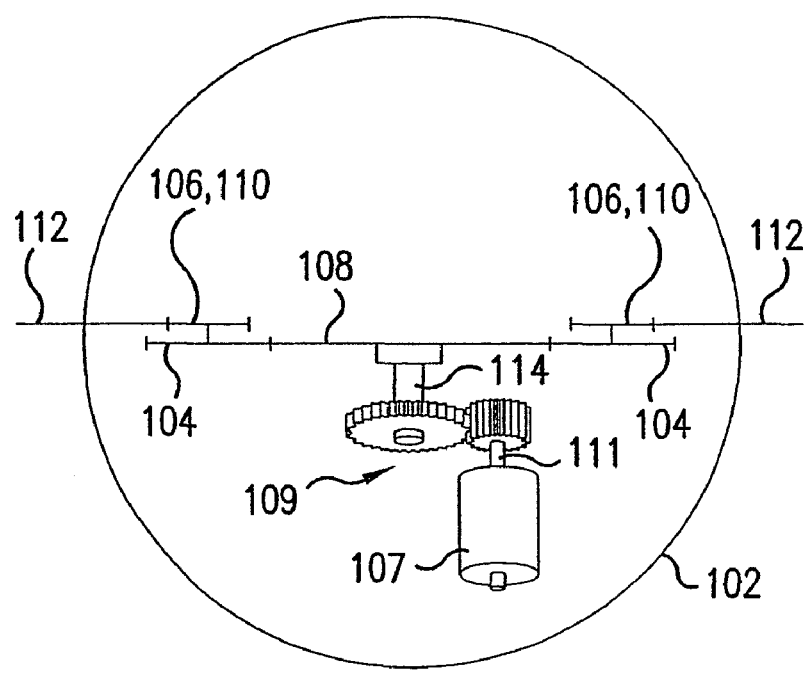
FIG. 23 is a drawing of an inside of the sphere from the side.

As shown in FIG. 22, the second embodiment of the present invention solves this matter by utilizing a wheel, which shall be referred to as the "center wheel" 108, smaller in diameter as compared to the wheel 24 in the first embodiment, and introducing a line of smaller wheels, hereafter the "outer wheels" 104, around the periphery of the center wheel. For example, if the sphere 102 is five meters in diameter, the center wheel 108 might be two meters in diameter, with a line of the outer wheels 104 one meter in diameter each around the center wheel 108. The gearboxes 106 (which also include inner pulleys 110) are installed above and have a common shaft with the smaller outer wheels 104 which turn the larger center wheel 108. Such a reduction in the size of the center wheel 108 and the introduction of a line of outer wheels 104 will reduce the number of spring lines 112 which the system can accommodate. The five meter sphere 102 referred to in this paragraph above, for example, will be able to accommodate only eight outer wheels 104 and spring lines 112, not the twelve spring lines contemplated in the first embodiment.

Another feature that differs from the first embodiment, which will simplify the inner workings of the electrical generator, will be to change the center wheel 108 and the outer wheels 104 from the vertical plane to the horizontal plane. This will significantly shorten the distance between the point where the spring lines 112 enter the sphere 102 and the gearboxes 106. The spring lines 112 enter at the approximate equator of the sphere 102, and the gear boxes 106 with the inner pulleys 110 will be in a parallel plane and slightly above the plane of the outer wheels 104 and the center wheel 108. This will eliminate the need to run some of the spring lines 112 around the periphery of the inside of the sphere 102 as shown in FIG. 13, and the need for lengthy belts between some of the outer pulleys and the inner pulleys at the gearboxes. It will also eliminate the variation in the angles at which the outer pulleys and belts approach the inner pulleys, since now they all will be in the same plane, so only one type of gear, perhaps a helical gear, will be needed for all the gearboxes.

Changing the center wheel from the vertical to the horizontal plane will result in rotating the low-speed shaft 114 to the vertical plane. This rotation will put one of the nacelles (not shown) with its wind generator 107 in the lower half of the sphere 102 and the other in the upper half of the sphere 102. In this configuration it may be more advantageous to simply eliminate the upper nacelle and generator and utilize only a single wind generator system in the lower part of the sphere 102, where the cooling system is already located. As shown in FIG. 23, a gearbox 109 is provided between the low-speed shaft 114 and a high-speed shaft extending from the generator 107.

Rotating the center wheel 108 to the horizontal plane also may make it feasible to eliminate the outer pulleys and belts and simply to run the spring line 112 directly to the inner pulley 110 at the gearbox 106. If this is done, the operation of the invention will change because the spring line 112 will apply pressure to the inner pulley 110, now the only pulley, and drive the gear to turn the outer wheel 104 and the center wheel 108, and thus generate electricity, only when the spring line 112 is being pulled out of the sphere 102, not when it is being rewound on the spool 114. The function of the two outer pulleys and their belts is to generate electricity when the spring line is not under pressure and retracting as well as when it is under positive pressure. The benefit of simplifying the inner workings of the system may outweigh this capability, since there are spring lines 112 going in all directions from the sphere 102, and when one spring line 112 is not under pressure it is likely that several other spring lines will be.

Third Embodiment

The third embodiment of the power generator according to the present invention will be described in detail with reference to FIGS. 24-33.

In the first and second embodiments, the entry points of the spring lines are provided at the equator of the sphere, which is its approximate waterline. Given the fact that the spring lines move in and out of the sphere, it is believed that the present state of the art of making objects watertight may not include the capability of making such lines watertight. It has been suggested that it is presently possible to make a shaft through a wall virtually watertight, but not a line moving in and out through the wall.

In view of this, the power generator according to the third embodiment eliminates this potential problem, while offering other advantages.

Center Cylinder

The sphere in the center of the external array, in the first and second embodiments, is changed to a vertical center cylinder 202 (first floating unit) which rides about two-thirds or three-fourths of the way down in the water, with one-third or one-fourth of the length of the center cylinder 202 out of the water. For example, the center cylinder 202 might be five meters in diameter and 16 meters in length, with four meters above the waterline. In this variation the spring lines enter the center cylinder 202 at the top end, which is now out of the water most if not all of the time. The top of the center cylinder 202 has a spherical roof 204 so that both seawater and rainwater will roll off it, and the spring lines enter the center cylinder 202 through spring line ports 206 provided below the roof.

Ring Cylinders

Figure 25:
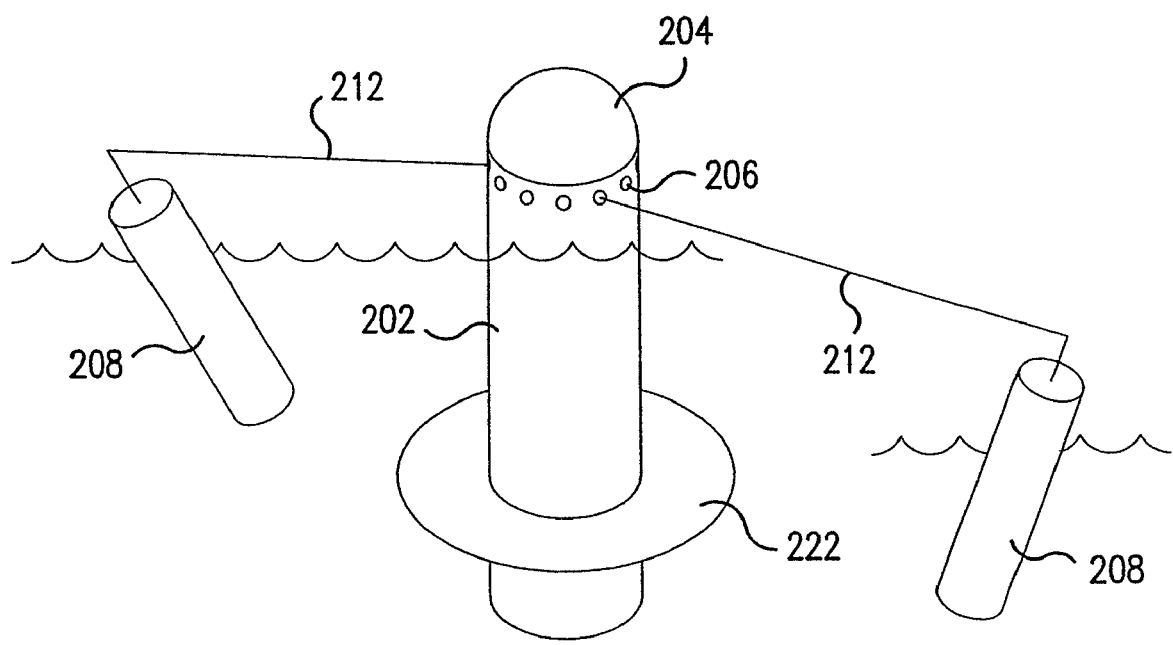
FIG. 25 is a drawing of the center cylinder, ring cylinders, and spring lines.
Figure 26:
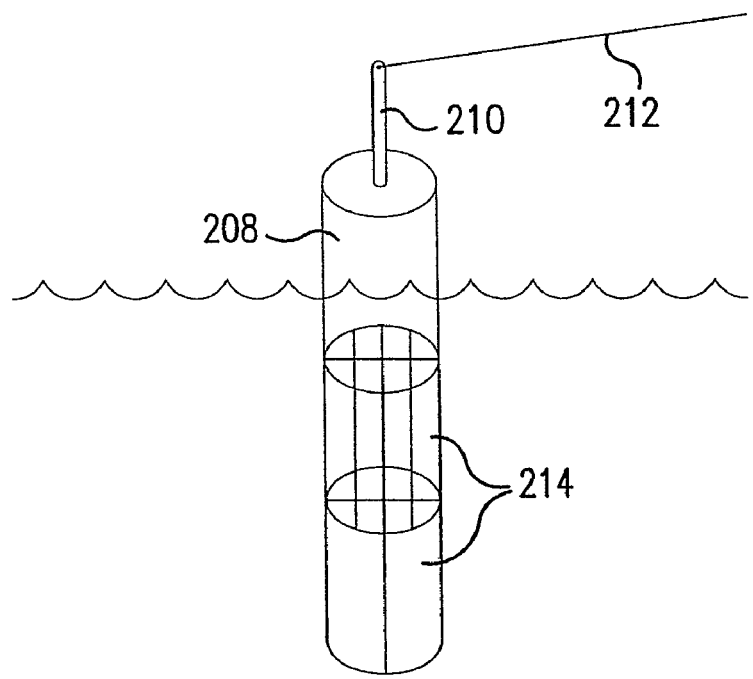
FIG. 26 is a drawing of outside and inside views of a ring cylinder.
Figure 27:
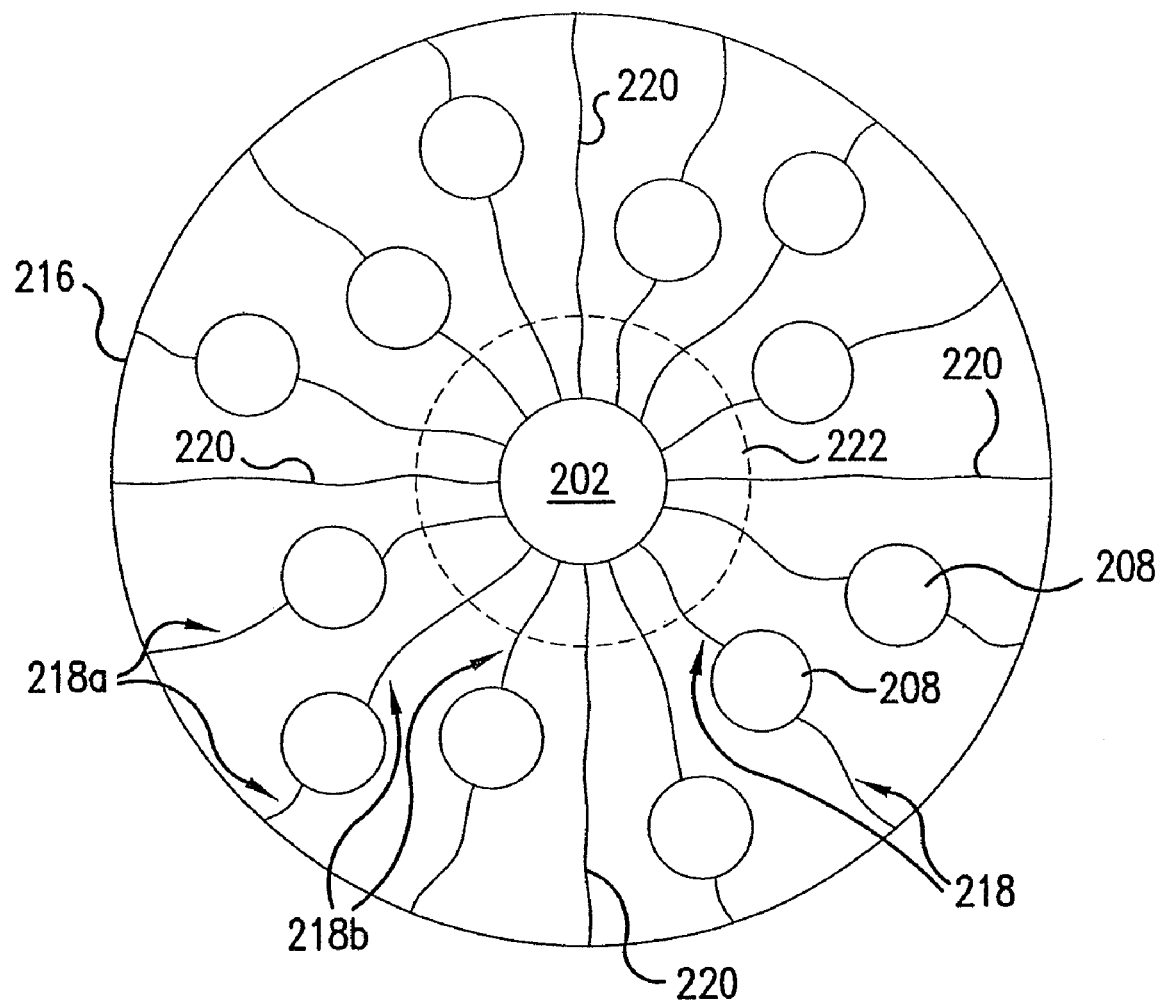
FIG. 27 is a drawing of the center cylinder, ring cylinders, and a pipe ring from above, showing strong lines and slack lines.

In this embodiment the ring in the first embodiment is changed to a ring of vertical ring cylinders 208 (second floating unit) around the center cylinder as shown in FIG. 25 and FIG. 27. The ring cylinders 208 may be smaller than the center cylinder 202 and also ride about two-thirds or three-fourths of the way down in the water. As shown in FIG. 26, each ring cylinder 208 has a mast 210 attached to its top, with the mast 210 about equal in length to the diameter of the ring cylinder 208. As shown in FIG. 25, a spring line 212 runs from the top of the mast 210 on the ring cylinder 208 to the top of the center cylinder 202. For example, if the ring cylinder 208 is two meters in diameter and eight meters in length, it will ride about six meters down in the water with about two meters above the water, and the mast 210 will also be about two meters in length. In such a configuration, the top of the mast 210 would be at about the same height above the water as the top of the center cylinder 202, i.e., four meters above the water line. This will permit both ends of the spring line 212 to remain out of the water most of the time. The mast 210 will serve two functions. In addition to elevating the outer end of the spring line 212 to keep it out of the water, the mast 210 will also increase the effect on the spring line 212 of the movement of the ring cylinder 208 in the waves. As shown in FIG. 26, there is nothing inside the ring cylinders 208 except ballast tanks 214 to keep them down in the water. For convenience of assembly on site the ballast may be ocean water in four or more discrete vertical tanks none of which run completely across the cylinder.

Pipe Ring

While the ring cylinders 208 serve as the outside terminus for the spring lines 212 in this embodiment, it will still be necessary to employ a floating pipe ring 216 to serve as the outside terminus for the slack lines. As shown in FIG. 27, the slack lines 218 serve the same function as in the first embodiment, keeping the floating parts of the system in approximate position relative to each other, i.e., in this case keeping the ring cylinders 208 in position relative to the center cylinder 202, while at the same time permitting the ring cylinders 208 to move freely in the waves. The pipe ring 216 is a rigid circle outside the ring cylinders 208 to which an outer set of slack lines 218a is attached. The other end of each of these outer slack lines 218a is attached to the approximate water line of one of the ring cylinders 208. There is another set of slack lines, the inner slack lines 218b, which run from the ring cylinders 208 to the center cylinder 202. The length of the slack lines 218 need not be the same, either between the inner and outer Slack Lines 218b and 218a, or between adjoining outer and inner slack lines 218a, 218b. Thus, for example, as shown in FIG. 27, it may be advantageous to employ a varying ring of ring cylinders 208, with some closer to the center cylinder 202 and others closer to the pipe ring 216. This would provide more room for each of the ring cylinders 208 to move in the waves.

Strong Lines

In order to keep the pipe ring 216 in position around the center cylinder 202, it may be helpful to introduce a new set of lines which will run directly between the pipe ring 216 and the center cylinder 202. These lines, which we shall call strong lines 220, will be slightly longer in length than the distance between the pipe ring 216 and the center cylinder 202, will be evenly spaced around the center cylinder 202 and will be fewer in number than the slack lines 218 as shown in FIG. 27. Four strong lines 220 will be sufficient, for example, one each generally to the north, east, south, and west. The strong lines 220 will be strong enough to prevent the pipe ring 216 from significantly reducing the distance between it and the center cylinder 202. Thus, for example, if the distance from the center cylinder 202 to the pipe ring 216 is 10 meters, the strong lines 220 would be about 11 meters in length, so there would be about one meter of slack to accommodate the up and down movement of both the pipe ring 216 and the center cylinder 202 in the ocean waves (The height of the ocean waves to be expected at any given location will need to be taken into account in determining the size of the structures to be utilized. A process of triangulation would suggest that in the example referred to here, a distance of 10 meters between the center cylinder 202 and the pipe ring 216, an 11 meter strong line 220 would accommodate a wave height of over four meters, i.e., 13 feet, assuming that at times the pipe ring 216 will be at the top of a wave and the center cylinder 202 will be at the bottom of a wave, and vice versa).

Action of Strong Lines and Pipe Ring

The action of the strong lines 220 and the pipe ring 216 will be as follows: when there is pressure on the pipe ring 216 from the waves to move toward the center cylinder 202 from one direction, for example from the west, the strong line 220 running from the pipe ring 216 to the center cylinder 202 on the west will become slack. The movement of the pipe ring 216 in an easterly direction, however, will cause the strong line 220 on the opposite side of the center cylinder 202, that is on the east, to become taut and to prevent any further relative movement of the pipe ring 216 in that direction, that is, it will prevent the pipe ring 216 on the west from moving any closer to the center cylinder 202.

Motion of Cylinders in Ocean Waves

Figure 28:
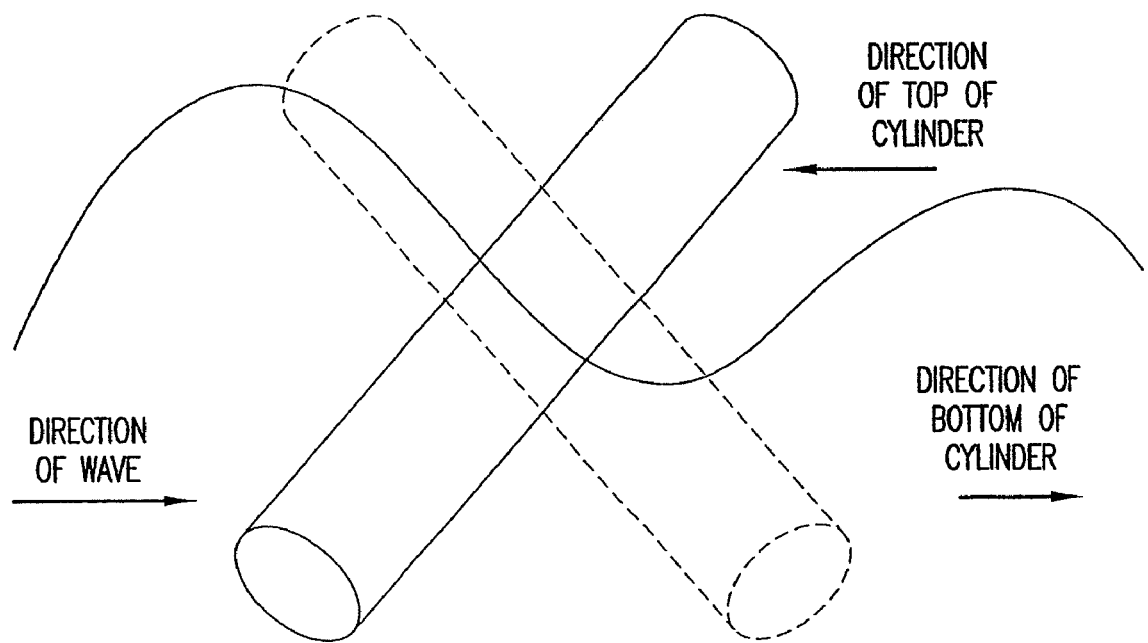
FIG. 28 is a drawing showing motion of the ring cylinder in ocean waves.

As stated previously, one reason for changing from the sphere to the center cylinder 202 in the center of the external array is to raise above the waterline the point at which the spring lines enter the center structure. Changing from the sphere to the center cylinder 202 will also change the dynamics of the impact of the ocean waves on the center structure. The vertical motion of the waves will have substantially the same effect on a cylinder as on a sphere, i.e., it will raise and lower both structures in the vertical plane. The horizontal motion of the waves, however, will affect the two structures differently. The horizontal motion of the waves will cause a sphere half way down in the water to roll, while, as shown in FIG. 28, it will cause a cylinder part way out of the water and part way under the water to wobble. The waterline of a cylinder floating part way out of the water acts effectively as a fulcrum around which the out-of water and underwater parts of the cylinder rotate, i.e., as the underwater part of the cylinder moves in one direction, the out-of-water part moves in the opposite direction.

Motion of Center Cylinder

Figure 24:
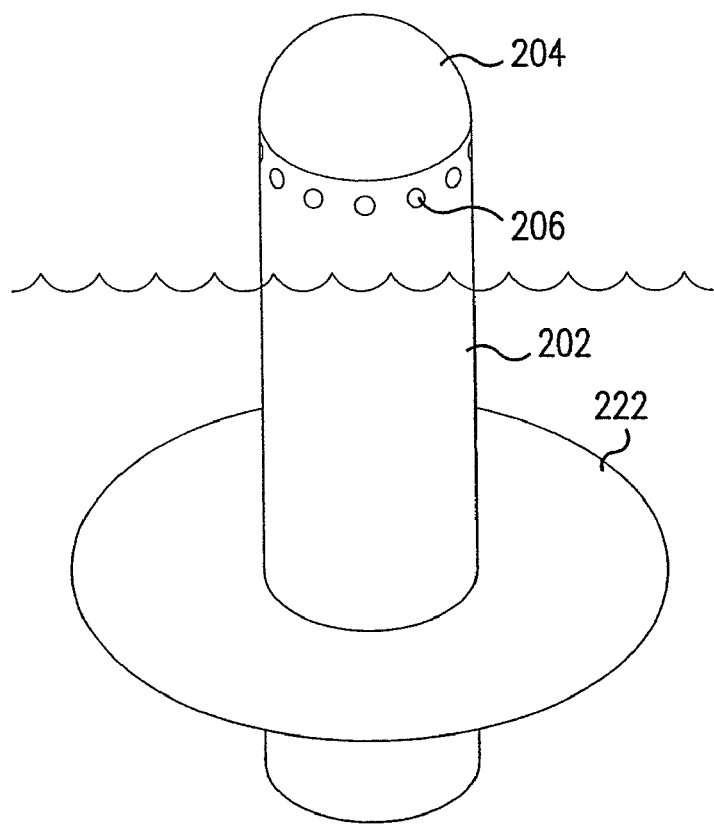
FIG. 24 is a drawing of an outside of a center cylinder according to a third embodiment of the present invention.

In this embodiment, it is the relative motion of the top of the masts 110 of the ring cylinders 208 and the top of the center cylinder 202 which results in the generation of electricity. That being the case, the greater the motion of both of these objects, the greater the amount of electricity that will be generated. On the other hand, it may not be desirable for the center cylinder 202 to wobble in the horizontal plane as well as to rise and fall in the vertical plane, since it contains the mechanically operating parts of the generator which may function better if they are relatively more stable. If that is the case, there are steps that can be taken to reduce the wobble of the center cylinder 202. For example, as shown in FIGS. 24, 25, and 27, the wobble of a cylinder in the water can be significantly reduced by the addition of a rigid horizontal skirt 222, about equal in width to the diameter of the center cylinder 202, around the circumference of the center cylinder 202 about two-thirds of the way down between the waterline and the bottom of the center cylinder 202. The effect of such a skirt 222 will be to keep the center cylinder 202 upright and steady in the water most of the time, although it does not affect the vertical motion of the center cylinder 202 in the waves. Whether the width of the skirt 222 would need to be about equal to the diameter of the center cylinder 202, and whether the skirt 222 would need to be horizontal, to have this damping effect on the wobble of the cylinder can be determined by testing. A narrower skirt, or a skirt at a reduced angle to the cylinder, or a combination of the two might have substantially the same effect, but these or other entirely unrelated methods of damping the wobble of the center cylinder 202 can be explored by testing.

Motion of Ring Cylinders

Unlike the center cylinder 202, there is no question that it will be advantageous for the ring cylinders 208 to wobble to the maximum extent possible, as well as to rise and fall in the vertical plane. It is the movement of the top of the mast 210 of the ring cylinder 208 relative to the top of the center cylinder 202 that pulls on the spring line 212 to generate electricity. The ring cylinder floating in the ocean will act effectively as a lever pulling on the spring line 212. In addition to raising and lowering the ring cylinder 208 in the vertical plane, each wave as it strikes the underwater or lower part of the ring cylinder 208 will push that part in the direction the wave is heading, and that movement will in turn move the out-of-water or upper part of the ring cylinder 208 in the opposite direction. The movement of the upper part of the ring cylinder 208 will be transmitted to the rigid mast 210 which in effect extends the length of the lever and pulls on the spring line 212. Since away from the shore the ocean waves do not come from one direction but from random directions, the movement of each of the ring cylinders 208 will be erratic and independent of all the other ring cylinders 208 and of the center cylinder 202 as well. This random and erratic motion of the ring cylinders 208 in the waves will result in substantial and fairly continuous generation of electricity by this embodiment.

It may be advantageous to set the spring line 212 so that its default or at rest position is at the point where the top of the mast 210 of the ring cylinder 208 is at its closest point to the center cylinder 202, that is, with the ring cylinder 208 tilted toward the center cylinder 202 to the maximum extent. That way any movement of the top of the mast 210 in any direction will pull on the spring line 212.

Inside the Center Cylinder

In this embodiment, the interior parts of the center cylinder 202 include the following, from the top down:

Entry Wheel

Figure 29:
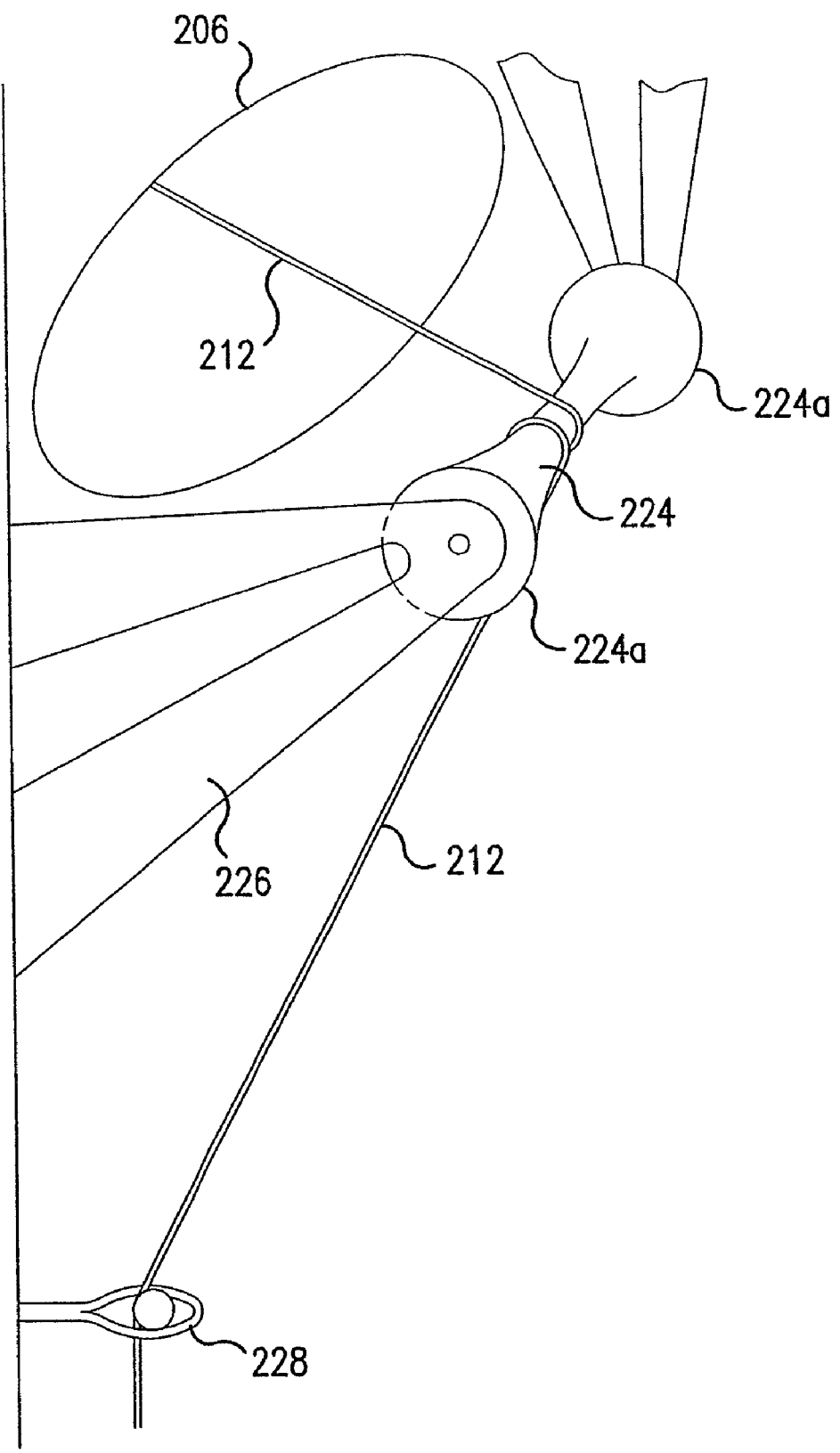
FIG. 29 is a drawing showing a spring line port, entry wheel, and a guide.

As shown in FIG. 25, from each ring cylinder 208, the spring line 212 runs to the top of the center cylinder 202 where it enters the oval shaped opening or port 206 in the side of the center cylinder 202 under the roof 204 and, as shown in FIG. 29, winds once or twice around a small freely turning entry wheel 224 mounted near the edge of the center cylinder via a bracket 226 attached to an inner surface of the inner cylinder 202. There is a separate opening 206 and entry wheel 224 for each spring line 212, and the entry wheels 224 are mounted so that the spring line 212 does not touch the side of the center cylinder 202 as it enters. The entry wheel 224 is wide and has a high rim 224a on each side so that the entry wheel 224 can receive the spring line 212 from any angle that the ring cylinder 208 may assume relative to the center cylinder 202. This angle will vary in both the horizontal and vertical planes. It will vary in the horizontal plane depending upon where the ring cylinder 208 is at any given time in the area of the ocean which the slack lines 218 permit the ring cylinder 208 to occupy relative to the center cylinder 202. The angle will vary in the vertical plane depending upon whether the ring cylinder 208 and the center cylinder 202, each of which is moving independently in the waves, is at the top, middle or bottom of its respective wave at any given moment. The function of the entry wheel 224 is simply to change the direction of the spring line 212 from generally horizontal to vertical. From its entry wheel 224, each of the spring lines runs down into the center cylinder 202 to the first of a series of guides 228, perhaps a screw eye with a freely turning wheel in the eye, fastened to the side of the center cylinder 202 below the entry wheel 224.

Catch Basin

Figure 30:
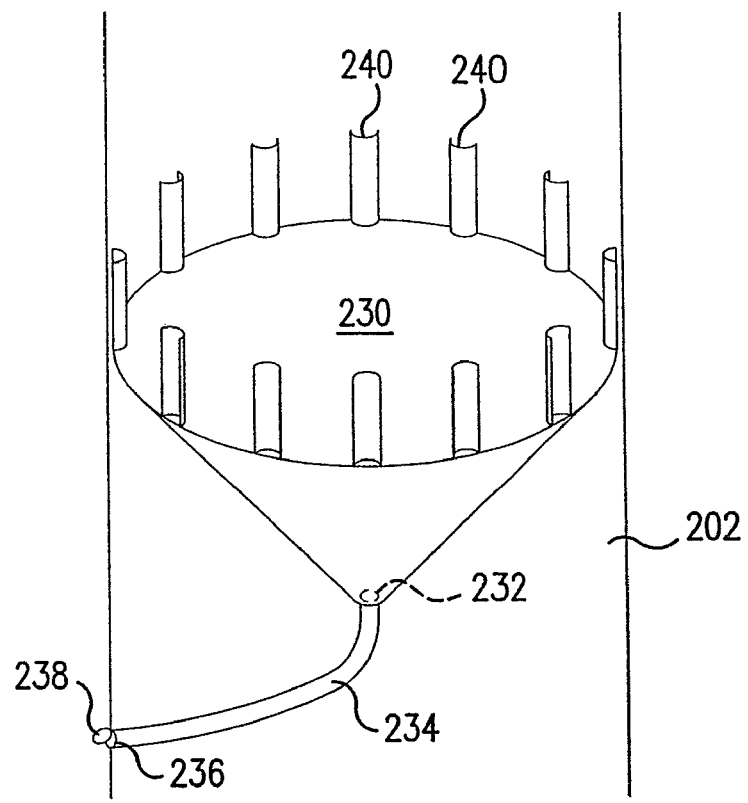
FIG. 30 is a drawing of a catch basin.

Mounted below the circle of entry wheels 224 and the first row of spring line guides 228 inside the center cylinder 202 there is a catch basin 230 to capture and direct any water which may enter the top of the center cylinder 202 through the oval openings 206 for the spring lines 212 as shown in FIG. 30. The catch basin 230 is in the shape of a cone which funnels the water to a hole 232 at the bottom of the cone in the center of the center cylinder 202. From the hole 232 at the center of the catch basin 230, a hose 234 carries the water by gravity down to a discharge opening 236 above the waterline at the side of the center cylinder 202. On the outside of the discharge opening there is a flapper valve 238 which permits the water in the hose to exit the center cylinder 202 but does not permit seawater to enter the opening 236. Around the periphery of the top of the catch basin 230, there are a series of vertical tubes 240 which permit the spring lines 212 to pass through the catch basin 230. Inside the tubes 240, there is an absorbent material (not shown) which takes water from the spring line 212 as it passes through the tube 240. At the bottom, the tube 240 extends out over the catch basin so that any water which accumulates in the absorbent material will run down into the catch basin 230.

Horizontal Wheel Assemblies

Below the catch basin 230 inside the center cylinder 202, there is a series of two or three or more Horizontal Wheel Assemblies each of which is similar to the wheel assembly in the second embodiment, i.e., a center wheel and smaller outer wheels around the periphery of the center wheel. If there are three of these horizontal wheel assemblies, for example, the top one is identified as wheel assembly 1, the middle one is wheel assembly 2, and the bottom one is wheel assembly 3. As in the second embodiment, if the diameter of the center cylinder is about five meters, the diameter of the center wheels is about two meters and the diameter of the outer wheels is about one meter each. One reason for multiple horizontal wheel assemblies in the center cylinder of this embodiment is to increase the number of spring lines which can be accommodated in the center structure. As indicated in the second embodiment and shown in FIG. 23, since the single very large center wheel has been replaced by a somewhat smaller center wheel 108 surrounded by still smaller outer wheels 104, there is a physical limit to the number of spring lines which can be accommodated. Thus, for example, as indicated in the second embodiment, a single horizontal wheel assembly in a five meter diameter sphere or cylinder with a two meter center wheel will be limited to eight outer wheels, which means eight spring lines. Putting in two or three of such horizontal wheel assemblies in the center cylinder will double or triple the number of spring lines which can be accommodated. Multiple horizontal wheel assemblies will also permit flexibility in the number of spring lines assigned to turn each center wheel. Thus, for example, if there are 12 ring cylinders in the external array, the 12 spring lines can be allocated 6 and 6 between two horizontal wheel assemblies, or 4, 4, and 4 among three horizontal wheel assemblies.

Pulley and Gear

As shown in FIG. 29, from the entry wheel 224 at the top of the center cylinder 202, each of the spring lines 202 runs down inside the center cylinder 202 through one or more guides 228, perhaps screw eyes with a small freely turning wheel inside each eye. The guides 228 are fastened to the side of the center cylinder 202 and guide the spring line 212 through the catch basin 230 and then to a pulley and gear mounted above one of the outer wheels of one of the horizontal wheel assemblies, which will be described in more detail. The spring line 212 descends vertically, wraps around the pulley and then runs to a spool with a spring under slight pressure. The pulley is horizontal and its shaft turns a gear, perhaps a spiral bevel gear or a hypoid bevel gear, which is mounted above and has a common shaft with the outer wheel. The outer wheel turns the center wheel, the shaft of which is the low-speed shaft of a generator. The purpose of the gears, wheels and shafts between the pulley and the generator is to maximize the speed of the high speed shaft of the generator for whatever amount of pressure is being applied to the pulley by the spring line, so as to maximize the amount of electricity generated. What the optimum arrangement and size of gears, shafts and wheels to accomplish this will be will vary depending upon the diameter of the center cylinder and the distance to be covered between the pulley and the generator.

Single Generator Arrangement

Figure 31:
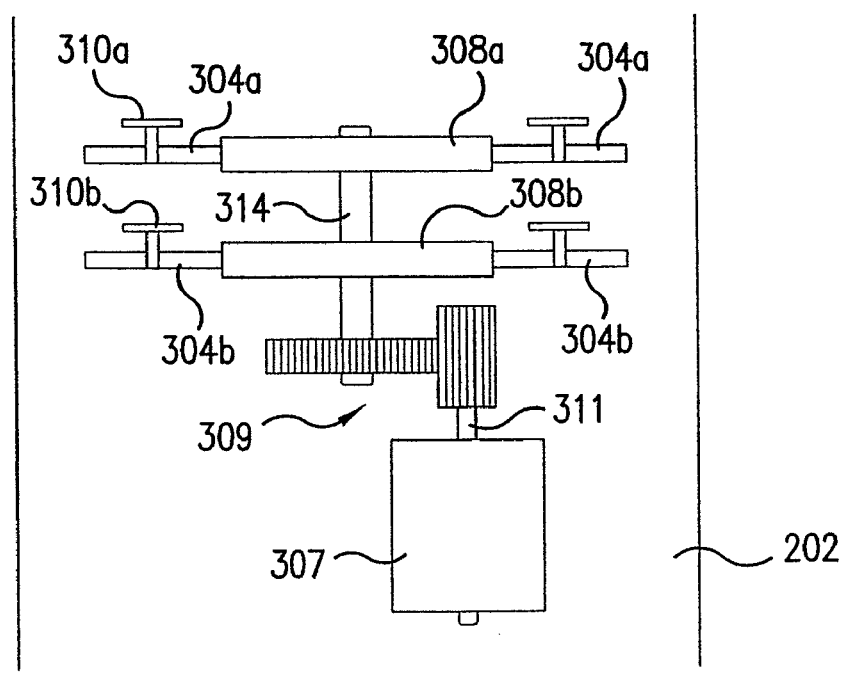
FIG. 31 is a drawing of a two horizontal wheel assembly.

To maximize the amount of electricity generated by this embodiment, the most desirable configuration is one in which the pressure of all of the spring lines 212 is combined and applied to a single low-speed shaft of a single generator. Where more than one horizontal wheel assembly is utilized, as shown in FIG. 31, this would mean an arrangement in which all the center wheels 308a and 308b turned a single low-speed shaft 314 and the torque of each center wheel was applied to the low-speed shaft 314 separately so as to accumulate the effect on the shaft 314. This may require a sophisticated coupling arrangement between the center wheels 308a, 308b, and the low-speed shaft 314 which may not presently exist. An arrangement in which two or more wheels 308a, 308b were fixed directly to a single low-speed shaft 314 may not accomplish this, since the first pressure applied to the first wheel 308a will have to turn all the wheel assemblies fixed to the shaft 314, not just the first wheel 308a, and it will take more pressure to turn the entire arrangement than it will to turn just one horizontal wheel assembly as shown in FIG. 23. In addition, once the entire arrangement was in motion and all the wheels were turning, a small amount of pressure on one of the outer wheels 304a or 304b may not be of any significance, since the outer wheel might already be turning faster than the added pressure would be able to turn it, so the additional pressure might have no or negligible effect. As indicated, if the technology presently exists for accumulating the torque of two or more wheels on a single shaft, that would be the preferred arrangement for this embodiment. In that event the order of parts in descending order would be, for example, in the case of the wheel assemblies previously referred to, wheel assembly 1, wheel assembly 2, and wheel assembly 3 all mounted on a single low-speed shaft connected to a gearbox and single wind generator. The low-speed shaft 314, a gearbox 309, a high-speed shaft 311, and a generator 307 in this embodiment are comparable to the same parts in the sphere, as shown in FIG. 23.

Multiple Generator Arrangement

Figure 32:
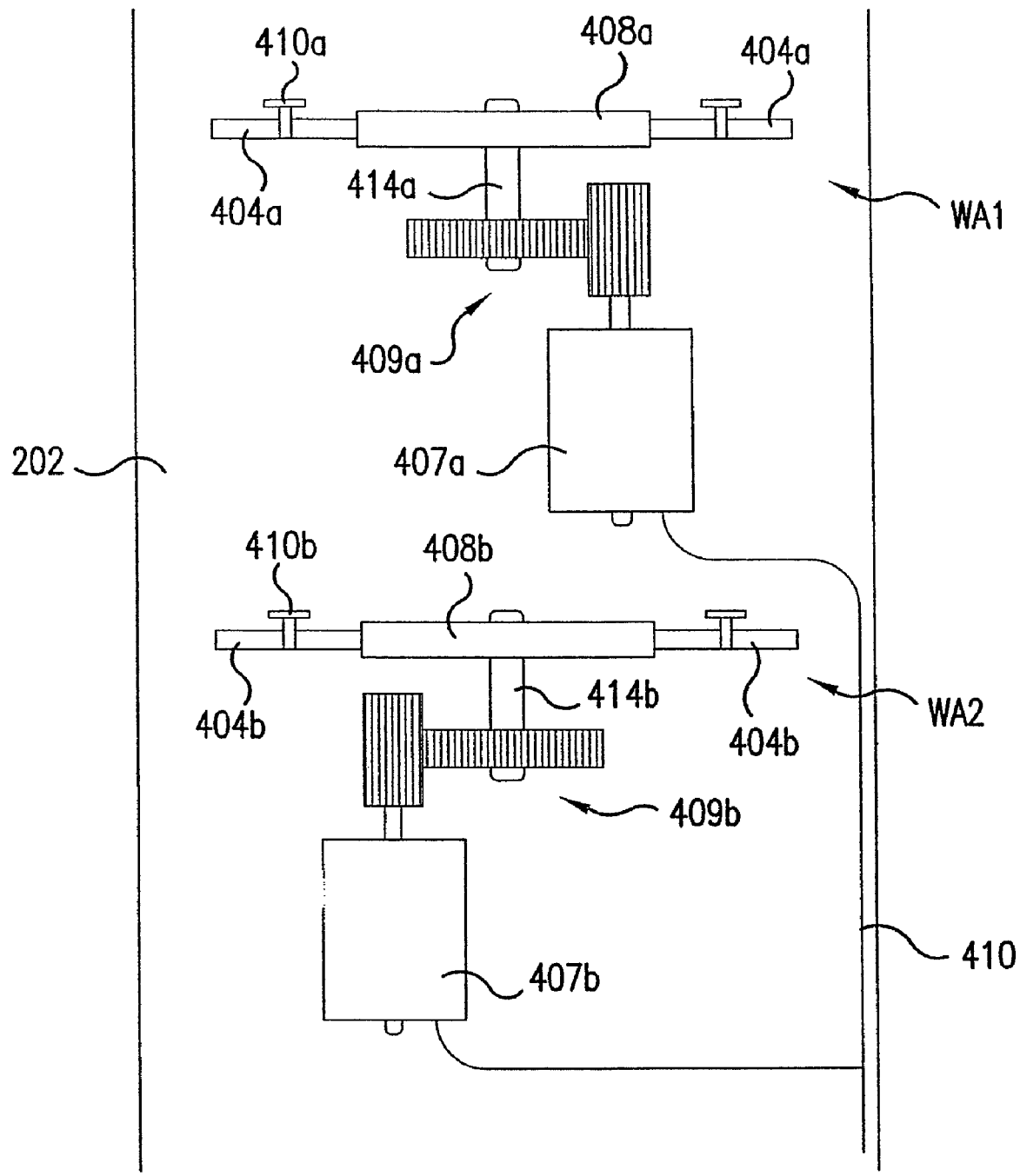
FIG. 32 is a drawing of another arrangement of a two horizontal wheel assembly.

If the technology for accumulating the torque of two or more wheels on a single shaft does not presently exist, the preferred arrangement for this embodiment is to provide two wheel assemblies WA1 and WA2, each having a center wheel 408a (408(b)), outer wheels 404a (404b), and gears provided above and on the same shaft as the outer wheels as shown in FIG. 32. Each wheel assembly also has a low-speed shaft 414a (414b), gearbox 409a (409b), and a generator 407a (407b) provided below the wheel assembly. Thus for example, if there were two wheel assemblies, immediately below wheel assembly WA1 there would be the generator 407a, and immediately below wheel assembly WA2 there would be the generator 407b. As shown in FIG. 32, an electrical transmission line 410 extends from the generators 407a and 407b.

Other Parts

Figure 33:
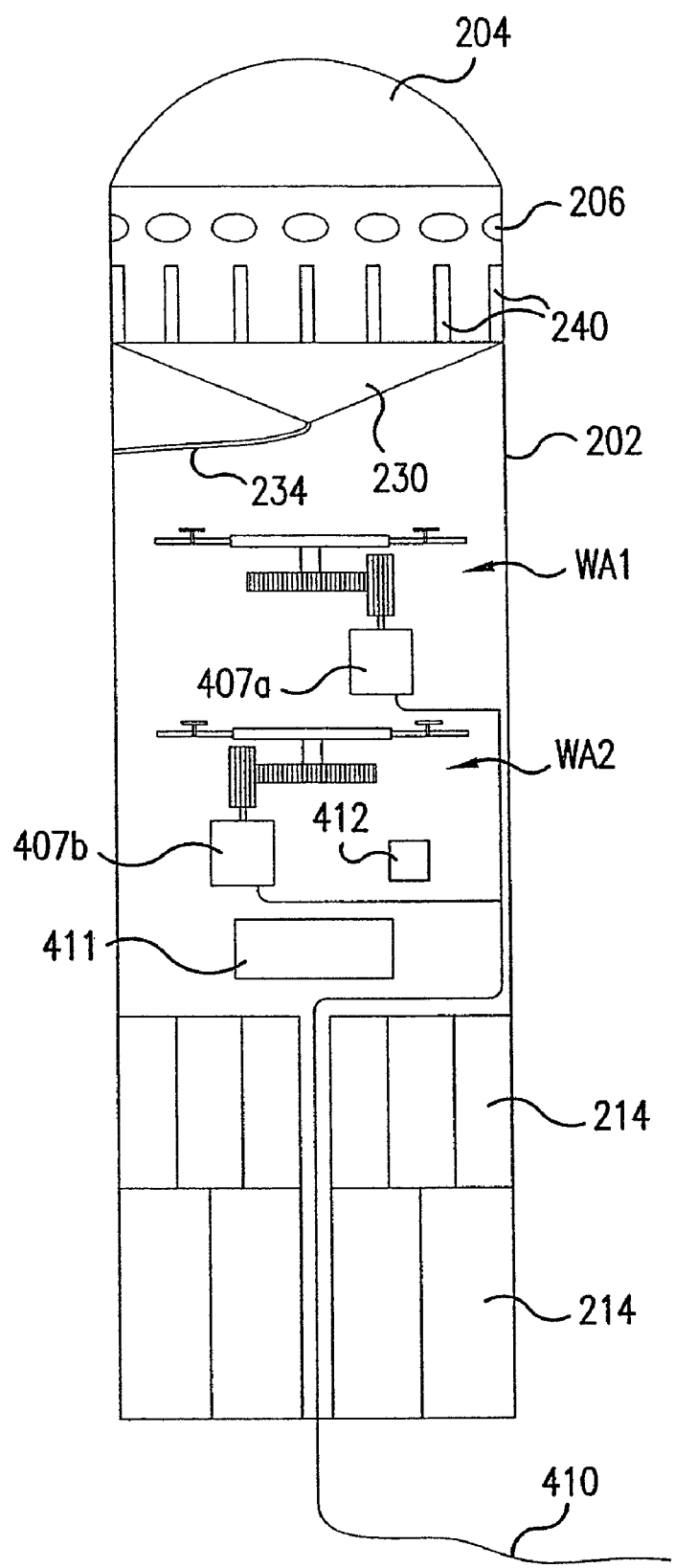
FIG. 33 is a drawing of an interior of the center cylinder viewed from the side.

As shown in FIG. 33, below the generator, or the lowest generator 407b in a multiple generator arrangement, are the cooling system 411 and the electrical transmission line or lines 410 and Electrical Controls 412, which are comparable to the same parts described in the lower part of the sphere in the first embodiment.

Ballast

Since the center cylinder 202 is to ride about two-thirds or three-fourths of the way down in the water, it is likely it will be necessary to add weight to the above listed interior parts to maintain that position. To do so ballast tanks 214 for ocean water will be built into the lower part of the cylinder 202. While other forms of ballast could be used, for ease of assembly of the system at sea, ocean water should suffice, as long as the water is kept in several discrete tanks 214 and the tanks 214 are kept full, so as not to interfere with the stability of the center cylinder 202.

Anchoring System

In this embodiment, it is the center cylinder 202, rather than the ring cylinders 208 or the pipe ring 216, that will be anchored utilizing the same kind of an anchoring system described for the sphere and ring of the first embodiment. Movement of the center cylinder 202 in the ocean waves is not critical to the generation of electricity, and in fact as previously indicated, reducing such movement may contribute to more efficient operation of the interior workings of the center cylinder 202.

Fourth Embodiment

The wave powered electrical generator according to the fourth embodiment of the present invention will be described in detail with reference to FIGS. 34-39.

The purpose of the fourth embodiment is to change two aspects of the third embodiment. The first change is to combine in a single device the capability to capture both the horizontal and the vertical aspects of ocean wave energy. The third embodiment captures only the horizontal aspect of wave energy. The second change is to transfer the energy captured by both the horizontal and vertical parts of the device to a single generator shaft in order to maximize the amount of electricity generated. The third embodiment does not have the capability of delivering all the energy captured to a single generator shaft.

To clarify the terminology being used, by the horizontal aspect of ocean wave energy is meant the observable fact that waves move horizontally over the face of the ocean. By the vertical aspect of ocean wave energy is meant the equally observable fact that a rowboat anchored in the ocean will move up and down with each passing wave.

Externally, the fourth embodiment does not differ very much from the third embodiment as shown in FIG. 26 and FIG. 27. It still has an outer ring 216, multiple outer cylinders 208 with spring lines 212 running from their masts 210 to the top of the center cylinder 202 (now 501), and strong lines 220 and slack lines 218a and 218b on the surface of the ocean to keep the cylinders 208 and 501 in place relative to each other and the ring 216. The fourth embodiment differs from the third primarily in the shape of the center cylinder 501, which is more block-like with its diameter approximately equal to its height, and in the mechanisms inside the center cylinder 501 which transfer the motion of the ocean waves to the generator to produce electricity.

To capture both the vertical and horizontal aspects of ocean wave power, and to combine the two sources of wave energy to turn a single generator shaft, the fourth embodiment utilizes a self-contained hydropower system employing a modified water turbine in the horizontal plane against which is directed a stream of fluid such as distilled water to turn the turbine and its shaft, which is also the shaft of the generator.

The Vertical Wave Power System

Figure 34:
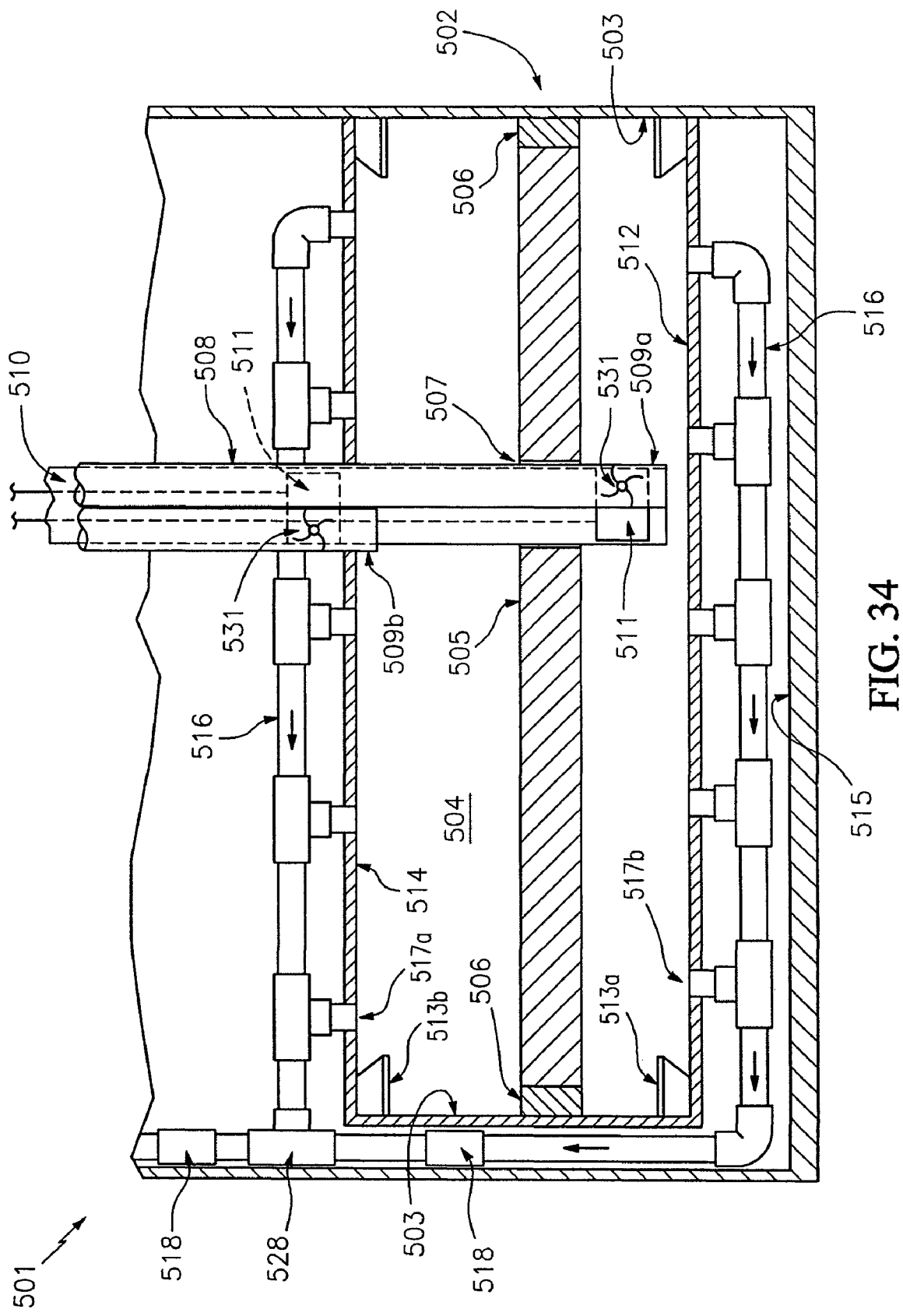
FIG. 34 is a drawing of the lower portion of the center cylinder from the side according to a fourth embodiment of the present invention showing among other things the vertical wave power device consisting of a pressure chamber containing a fluid such as distilled water, a free-floating mass serving as a piston in the fluid, and a system of pipes or hoses running from the ceiling and floor of the chamber to deliver the fluid under pressure to the upper part of the center cylinder (where a nozzle propels the fluid against the turbine, shown in FIG. 36)

In the fourth embodiment the vertical wave power system 502 at the bottom of the center cylinder 501 replaces the ballast 214 at the bottom of the center cylinder 202 in the third embodiment. As shown in FIG. 34, the vertical wave power system 502 includes a pressure chamber 503 containing a fluid 504, such as distilled water, with a free floating mass that is heavier than the fluid 504 and functions as a piston 505. The pressure chamber 503 occupies the lower section of the center cylinder 501 and the circular mass 505, shaped like a thick wafer, is almost equal in diameter to the pressure chamber 503. There is a piston ring 506 around the outer edge of the piston 505 which fills the space between the piston and the wall of the pressure chamber 503 to prevent the fluid 504 from passing while the piston 505 moves up and down in the pressure chamber 503. There are holes 507 in the piston 505 to accommodate the pipes 508 running through the pressure chamber 503 which contain the drain 509a and the cable run 510 with the auxiliary generators 511 described in paragraph 0131 below. Around the periphery at the bottom of the pressure chamber 503 a short distance above the floor 512 there is a reinforced platform which serves as a stop 513a to prevent the piston 505 from hitting the floor 512 of the pressure chamber 503. The width of the platform 513a all around is about $1/16^{th}$ of the diameter of the pressure chamber 503, so the two sides of the platform 513a together will support about $1/8^{th}$ of the piston 505 when it lands on the platform 513a. When the vertical wave power system 502 is at rest the piston 505 rests upon the lower platform or stop 513a. Around the top of the pressure chamber 503 there is a corresponding platform of the same size which serves as a stop 513b to prevent the piston 505 from hitting the ceiling 514 of the pressure chamber 503. There is a space between the floor 512 of the pressure chamber 503 and the floor 515 of the center cylinder 501 to accommodate the pipes or hoses 516 under the floor 512 of the pressure chamber 503.

The operation of the vertical wave power system 502 is as follows: When an ocean wave lifts the center cylinder 501 it also lifts the piston 505, which is resting on the stops 513a near the bottom of the pressure chamber 503. When the center cylinder 501 reaches the top of the wave it will stop rising but the momentum the free-floating piston 505 has acquired will cause the piston 505 to continue to rise, and the piston 505 will begin to compress the water or other fluid 504 in the pressure chamber 503 above it. The fluid 504 under increasing pressure escapes through a number of valves 517a in the ceiling 514 into hoses 516 at the top of the pressure chamber 503. The valves 517a are one-way valves that allow the fluid 504 to flow out of the pressure chamber 503 and prevent the fluid in the hoses 516 from entering the chamber 503. The hoses 516 are interconnected with a small booster pump 518 which propels the fluid 504 under pressure up to the level of the horizontal wave power system 540, shown in FIG. 35, where it is joined by fluid 504 from the horizontal wave power system 540. The fluid 504 from the two systems is then fed into another small booster pump 518 which raises the fluid 504 up to the level of the turbine 519, shown in FIG. 36, where it is fed into a larger booster pump 521 and then into a nozzle 522 which propels the fluid 504 against the turbine 519. The force of the fluid 504 causes the turbine 519 to turn, which turns the shaft 523 of the turbine 519 which is also the shaft of the generator 524, the turning of which produces electricity.

Figure 36:
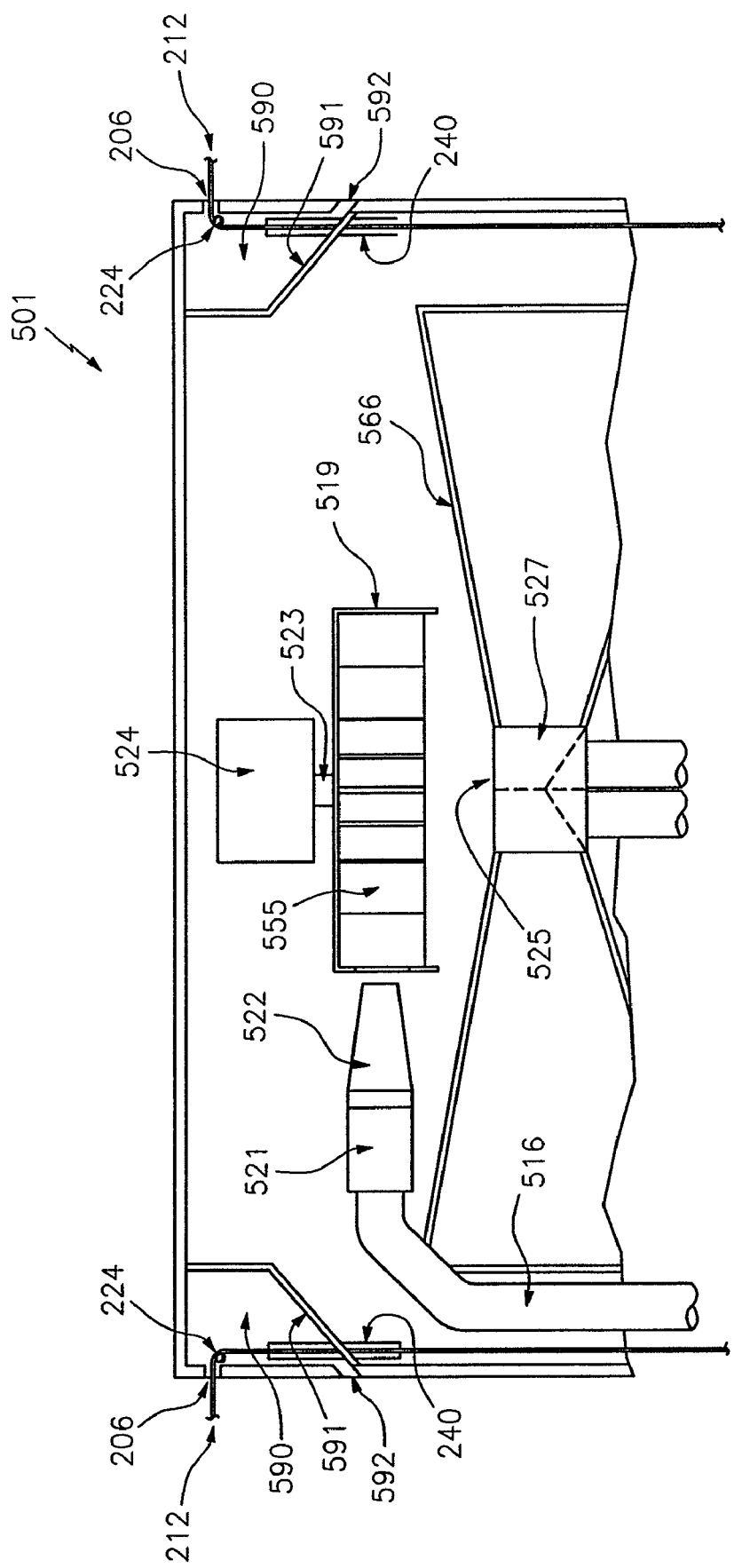
FIG. 36 is a drawing of the upper portion of the center cylinder from the side showing among other things the generator, its shaft, which is also the shaft of the horizontal water turbine, the upper part of the fluid delivery system consisting of a pipe or hose connected to a booster pump and the nozzle, and the upper part of the fluid runoff and distribution system beneath the turbine.
Figure 37:
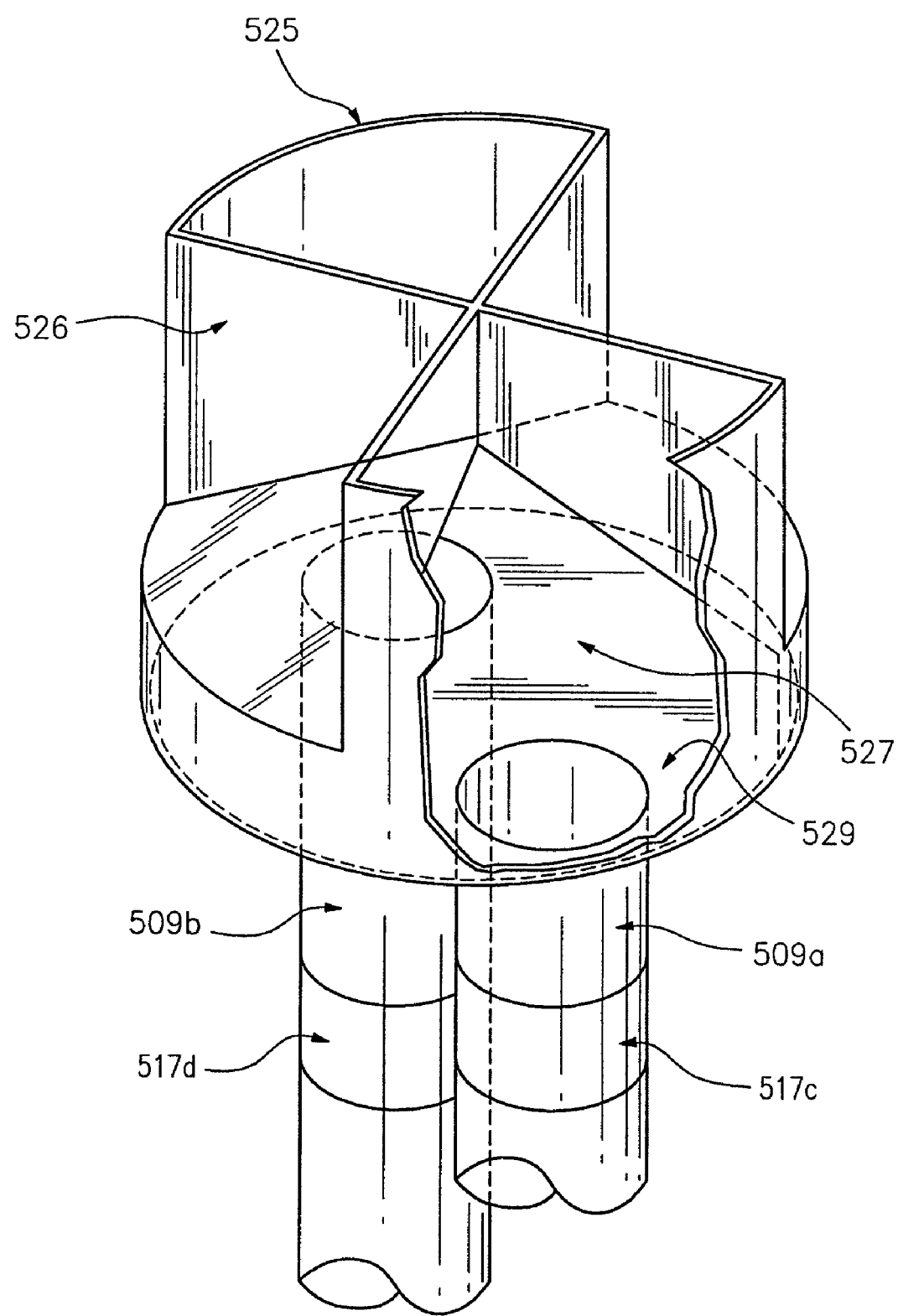
FIG. 37 is a drawing from the side of part of the fluid runoff system underneath the turbine showing the divided or X drain which distributes about half of the runoff fluid to the vertical wave energy system and half to the horizontal wave energy system, including the sump under the X drain which collects the fluid from the vertical wave energy parts of the drain, which fluid then runs down to the pressure chamber from whichever of the two drainpipes in the floor of the sump is open at any given time.

As shown in FIG. 36, the fluid 504 that has been directed against the turbine 519, from both the vertical 502 and horizontal 540 wave power systems, flows into a drain 525 under the turbine 519. As shown in FIG. 37, the circular drain 525 contains an X shaped insert 526 which divides the fluid 504 approximately in half between the vertical 502 and horizontal 540 wave power systems. The fluid 504 for the vertical system 502 flows into a sump 527 from which two drainpipes 509a and 509b run down to the pressure chamber 503. While the piston 505 is rising the longer drainpipe 509a is open and discharges fluid 504 into the lower part of the pressure chamber 503 below the piston 505. As the wave passes, the center cylinder 501 will begin to fall but the piston 505 inside the pressure chamber 503 will continue to rise and apply pressure to the fluid 504 above it until the piston 505 has exhausted all of the momentum it gained from the wave.

When the piston 505 loses its upward momentum it will stop rising and gravity will cause it to begin to fall. As the piston 505 falls its weight will apply pressure on the fluid 504 which has now flowed into the area below the piston 505 in the pressure chamber 503. The fluid 504 under increasing pressure escapes through a number of valves 517b in the floor 512 into hoses 516 under the floor 512 of the pressure chamber 503, shown in FIG. 34. Similar to the valves 517a, the valves 517b are one-way valves that allow the fluid 504 to flow out of the pressure chamber 503 and prevent the fluid in the hoses 516 from entering the chamber 503. These hoses 516 are interconnected with a booster pump 518 which helps raise the fluid 504 under pressure up to the level of the top of the pressure chamber 503. There the fluid 504 is fed through a Y valve 528 into the same hose line 516 as the fluid 504 from the upper part of the pressure chamber 503, and is delivered to the turbine 519 the same way the fluid 504 from the upper part of the pressure chamber 503 was delivered.

The spent fluid 504 once again runs down the divided drain 525 to the sump 527 with the two drainpipes 509a and 509b to the pressure chamber 503. However, as shown in FIG. 37, when the piston 505 begins its descent it causes a valve 517c in or below the sump 527 to close off the drainpipe 509a to the lower part of the pressure chamber 503 and a valve 517d to open the other drainpipe 509b to the upper part of the pressure chamber 503, so the runoff fluid 504 now accumulates there above the piston 505. The piston 505 continues to fall and to apply pressure on the fluid 504 beneath it. Before the piston 505 reaches the stops 513a at the bottom of the pressure chamber 503, shown in FIG. 34, the next wave will likely begin to raise the center cylinder 501 and the stops 513a to meet the piston 505, the cylinder 501 and the stops 513a will end the downward movement of the piston 505, and the cycle will begin again.

The Auxiliary Generators

As shown in FIG. 34, the vertical wave power system 502 is at the lower part of the center cylinder 501 while as shown in FIG. 36 the turbine 519 is in the upper part of the center cylinder 501. This means that the vertical wave power system 502 will have to overcome gravity to force the distilled water or other fluid 504 up to the level of the turbine 519 before the force of the fluid 504 can be applied against the turbine 519 to generate electricity. At the same time, however, the fluid 504 in the drainpipes 509a and 509b will be falling from the level of the turbine 519 in the upper part of the center cylinder 501 to the lower part of the center cylinder 501 as it returns to the vertical wave power system 502. Due to gravity this falling water or other fluid 504 will produce a "head" that can be utilized to turn an auxiliary turbine 531 in each drainpipe 509a and 509b connected to an auxiliary generator 511 adjoining the drainpipe 509a or 509b, as shown in FIG. 34. Among other things these auxiliary generators 511 can be utilized to power small pumps 518 in the master hose lines 516 that deliver the fluid 504 to the turbine 519 in order to increase the rate of flow of the fluid 504 and offset at least partially the force of gravity acting on the fluid 504 as it comes up from the pressure chamber 503.

The auxiliary generators 511 also can be used to power a larger booster pump 521 in the large hose line 516 directly in front of the nozzle 522 that propels the stream of fluid 504 against the turbine 519, as shown in FIG. 36. This larger booster pump 521 can be used not only to increase but also to regulate the flow of fluid 504 against the turbine 519 and by so doing to regulate the amount of electricity produced by the generator 524. As shown in FIG. 34, the auxiliary generators 511 adjoining the drainpipes 509a, 509b are enclosed in a compartment 510 serving as a cable run which runs from above the pressure chamber 503 almost to its floor 512. The drainpipes 509a, 509b are circular and the cable run 510 is rectangular, and drainpipe 509a and the cable run 510 each has a corresponding shaped hole 507 in the piston 505 so the piston 505 is able to rise and fall in the pressure chamber 503 around these structures. Although not shown in FIG. 34, it will probably be advantageous to install a small piston ring around these two openings in the piston 505.

The Horizontal Wave Power System

Externally the horizontal wave power system 540 has not changed from the third embodiment and includes multiple outer cylinders 208 with their masts 210 and with spring lines 212 running to the center cylinder 501, as shown in FIGS. 25, 26 and 28. Inside the center cylinder the spring line ports 206 and entry wheel 224 shown in FIG. 29 remain the same. Since the diameter of the center cylinder 501 is greater than the diameter of the center cylinder 202 was in the third embodiment, the single catch basin 230 serving all the spring line ports 206 in the third embodiment is replaced in the fourth embodiment by placing each spring line port 206, with its entry wheel 224, in a separate entry compartment 590, as shown in FIG. 36. This entry compartment 590 will collect any sea water entering the port 206 on the floor 591 of the compartment 590, which floor 591 is slanted downward toward the wall 538 of the center cylinder and contains a drain 592 which runs through the wall 538 of the center cylinder 501 and discharges the sea water outside of the center cylinder 501. The spring line 212 runs from the entry wheel 224 through a vertical tube 240 in the floor 591 of the entry compartment 590.

Figure 35:
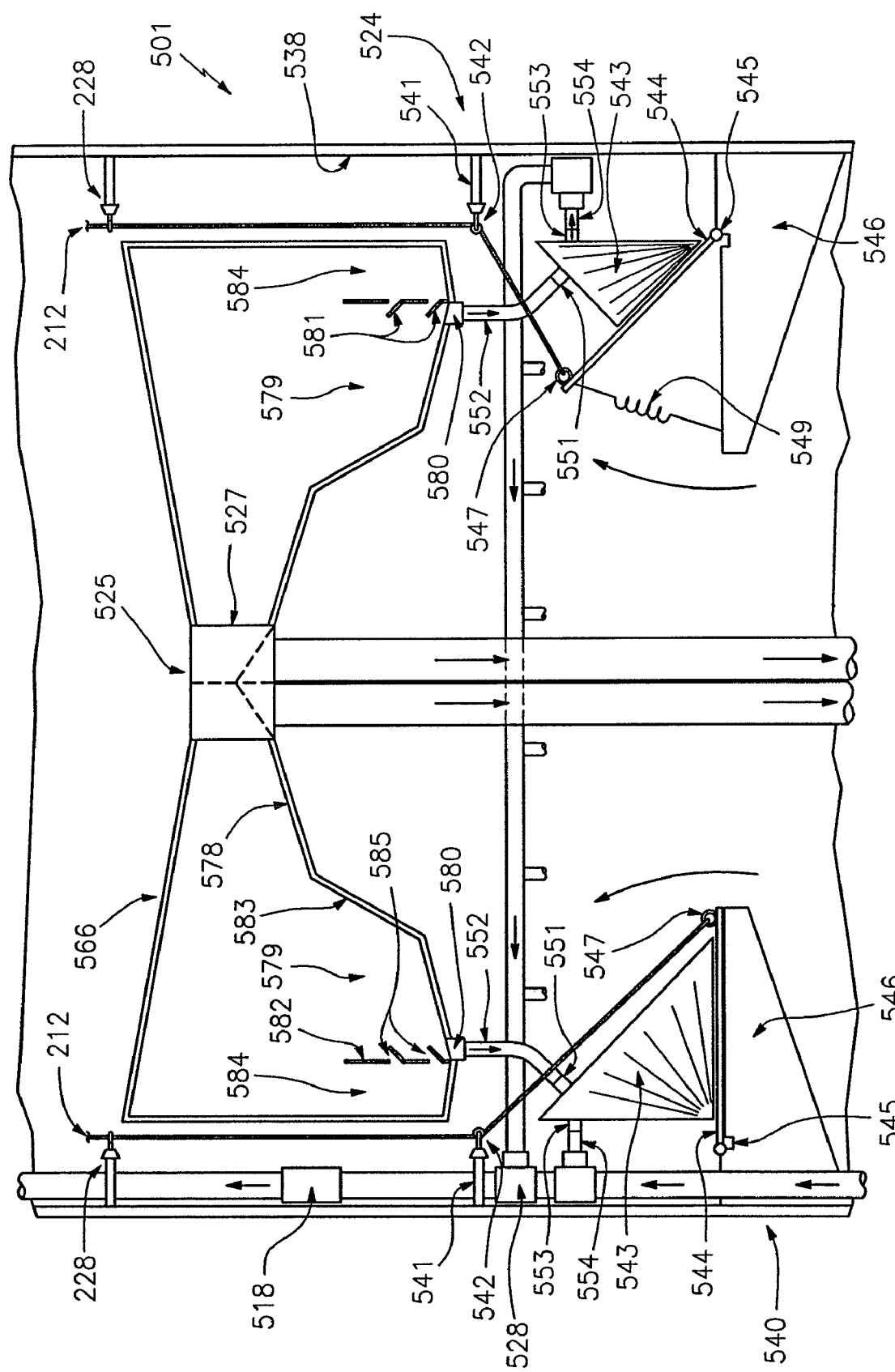
FIG. 35 is a drawing of the middle portion of the center cylinder from the side showing, among other things, the horizontal wave power device consisting of a circle of telescoping pouches containing the fluid, each resting on a hinged platform operatively connected to a spring line from an outer cylinder, pressure from which will raise the hinged platform to close the telescoping pouch and force the fluid out of the top of the pouch into a system of pipes or hoses running to the upper part of the center cylinder (where the nozzle propels it against the turbine, shown in FIG. 36)

In the fourth embodiment each spring line 212, after entering through its port 206, turning on its entry wheel 224, and passing through a vertical tube 240 in the floor 591 of the entry compartment 590, then runs to a guide on the wall 538 of the center cylinder 501 at the level of the fluid drainage and distribution system before reaching a reinforced bracket 541. As shown in FIG. 35, the spring line 212 wraps around a wheel 542 at the bracket 541. The bracket 541 is mounted above a telescoping pouch 543 full of fluid 504 which rests on and is attached to a flat rigid platform 544 horizontal to the wall 538 of the cylinder 501. The platform 544 and pouch 543 are pie shaped with the point toward the middle of the center cylinder 501 and the wide base against the wall 538 where the platform 544 is hinged 545. The hinge 545 allows the platform 544 to fold up from the horizontal toward the vertical, with the point of the pie moving up in an arc toward the wall 538 of the center cylinder 501. There is a frame 546, also pie shaped, under the platform 544 which helps support the weight of the pouch 543, but the frame 546 does not move with the platform 544. The spring line 212 runs from the wheel 542 at its bracket 541 to the tip of the pie shaped platform 544 where it hooks on to a ring 547 at the point of the platform 544. There is a second short spring line 549 attached to the bottom of the platform 544 below the ring 547. The short spring line 549 is connected at the other end to the frame 546 near the point. The pouch 543 has a framework inside it which allows it to expand and contract, and it has two valves and hoses connected to its upper end, one a supply valve 551 (a one-way valve that allows the fluid to enter the pouch 543 and prevents the fluid to be discharged from the pouch 543) and hose 552 through which fluid 504 enters the pouch 543 when it expands, and the other a discharge valve 553 (a one-way valve that allows the fluid to be discharged from the pouch 543 and prevents the fluid from entering the pouch 543) and hose 554 through which fluid 504 exits the pouch 543 when it contracts under pressure. When the pouch 543 is not under pressure it fills up with fluid 504. The action of the pouch 543 is not unlike a bellows, but it works with fluid 504, not air.

The operation of the horizontal wave power system 540 is as follows. The default position of the outer cylinder 208 can vary, but the most desirable is probably with its mast 210 leaning at a maximum tilt toward the center cylinder 501. In that position, any relative movement by the top of the mast 210 of the outer cylinder 208 away from the center cylinder 501 will put the spring line 212 under pressure and cause it to pull the ring 547 at the point of the platform 544 up toward the wall 538 of the center cylinder 501. That movement will cause the platform 544 to compress the pouch 543 and force fluid 504 out of the discharge valve 553 at the top into the discharge hose 554. In FIG. 35 the pouch 543 shown on the right side has been compressed about half way by its spring line 212. The fluid 504 will be delivered through a series of hoses 516 and booster pumps 518 to the nozzle 522 which will propel it against the turbine 519 which will turn and cause the generator shaft 523 to turn, thereby producing electricity. The greater the relative movement between the outer cylinder 208 and the center cylinder 501 the greater the pressure will be on the spring line 212 and the greater the amount of fluid 504 under pressure that will be discharged from the pouch 543, transmitted to the nozzle and propelled against the turbine 519.

When the movement of the outer cylinder 208 in the waves ceases to exert pressure on the spring line 212 and the spring line 212 slackens, the short spring line 549 attached to the underside of the platform 544 will become dominant and will pull the point of the platform 544 back away from the wall 538 of the center cylinder 501 and down toward the horizontal frame 546. As it does so the telescoping pouch 543 attached to the top of the platform 544 will open up and draw fluid 504 into the pouch 543 from the supply valve 551 and hose 552 until the pouch 543 is full again. When the platform 544 returns to its horizontal position on the frame 546 the cycle is ready to begin again the next time there is movement by the outer cylinder 208 relative to the center cylinder 501. The horizontal wave power system 540 works the same way for each of the eight, ten, twelve or whatever number of outer cylinders 208 there are, each of which moves at random in the ocean waves and independently of the other cylinders.

The Turbine

The turbine 519 is a modified hydropower turbine installed in the horizontal plane under the generator 524 in the upper portion of the center cylinder 501, with its vertical shaft 523 also serving as the shaft of the generator 524 above it, as shown in FIG. 36. One modification of the turbine 519 from a conventional hydropower turbine is in the shape of the blades 555 which are designed to discharge the fluid 504 more in a downward direction than in the opposite direction from which the fluid enters the turbine 519, as in a conventional hydropower turbine, while still transferring the kinetic energy of the fluid 504 to rotational energy to turn the shaft 523 of the turbine 519 and the generator 524. Depending upon the circumstances it may be desirable to make the diameter of the turbine 519 as large as possible while still accommodating the nozzle 522 next to it. In that case the turbine 519 may be off-center in the center cylinder 501 because of the need to place the nozzle 522 at the same level as the turbine 519.

The Large Booster Pump and the Nozzle

When the small booster pump 518 above the horizontal wave power system 540 sends the fluid 504 from both the vertical and horizontal wave power devices up to the level of the turbine 519, the single master hose 516 transmits the fluid 504 to the large booster pump 521, which accelerates the fluid to the nozzle 522 which then propels the fluid 504 against the turbine 519. With electronic sensors placed in various locations throughout the vertical and horizontal wave power systems, the large booster pump 521 and the nozzle 522 can be electronically programmed to deliver to the turbine blades 555 the optimum volume of fluid 504 at the optimum velocity to generate the maximum amount of electricity the system is capable of producing under the circumstances existing at any given time.

The Fluid Drainage and Distribution System

As shown in FIG. 36, after the fluid 504 is directed against the turbine blades 555 it falls into a runoff drainage system under the turbine 519. The upper part of this system is a shallow concave floor 566 covering the entire area under the turbine 519, with the drain 525 at the lowest point, approximately in the center. As shown in FIG. 37, the drain 525 is a large round hole divided by an X shaped insert 526 into four equal pie shaped sections which for purposes of identification only we shall call the north, east, south and west sections. Two of the sections opposite each other, for example the north and south sections, drain the fluid 504 to the vertical wave power system 502, while the other two, the east and west sections, drain the fluid 504 to the horizontal wave power system 540. The purpose of the X shaped insert 526 and the pairing of the opposite sections is to divide the runoff fluid 504 approximately equally between the vertical drainage and distribution system and the horizontal drainage and distribution system.

The Vertical Drainage and Distribution System

Both of the sections of the X shaped insert 526 serving the vertical drainage and distribution system feed the fluid 504 which runs into them into a single large sump 527 under the insert 526. From the floor 529 of the sump 527 two separate drainpipes 509a and 509b run down through the center of the horizontal wave power system 540 to the vertical wave power system 502 and into the pressure chamber 503 where the longer one, 509a, runs through a hole in the piston 505. In the pressure chamber 503 one of the drainpipes 509b discharges its fluid 504 into the upper part of the pressure chamber 503 above the piston 505, while the other drainpipe 509a continues down through the pressure chamber 503 and the piston 505 to the lower part of the pressure chamber 503 where it discharges its fluid 504 below the piston 505. At the top of the drainpipes 509a, 509b in or below the floor 529 of the sump there are valves 517c and 517d, which are connected mechanically or electronically to the piston 505, and which open and close the drainpipes 509a and 509b alternately, depending upon the movement of the piston 505. That is, when the piston 505 is rising, drainpipe 509a, which runs to the lower part of the pressure chamber 503, is open and drainpipe 509b is closed, and when the piston 505 is falling, drainpipe 509b, which runs to the upper part of the pressure chamber 503 is open and drainpipe 509a is closed. The auxiliary turbines 531 described in paragraphs 0131 and 0132 above are located near the bottom of each of the drainpipes 509a and 509b just above the discharge to the pressure chamber 503.

The Horizontal Drainage and Distribution System

Figure 38:
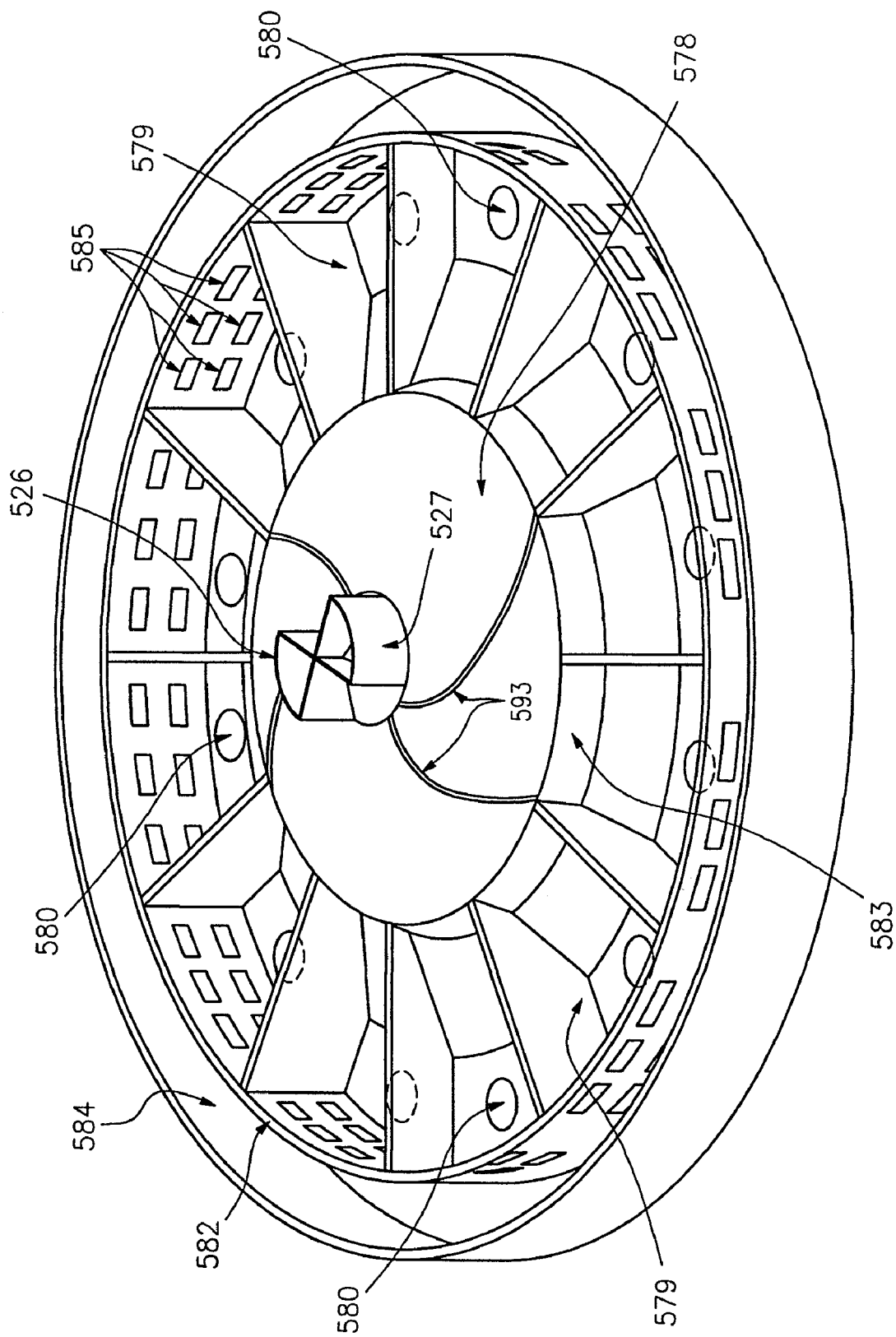
FIG. 38 is a drawing of the fluid distribution system for the horizontal wave energy system which distributes the fluid from the center drain to a cistern and then to a separate catch basin for each of the pouches, with a drain and hose to the pouch, and with a trough running around the periphery of the catch basins to receive any overflow from a catch basin and deliver it to another catch basin in need of fluid.

As shown in FIG. 38, each of the two sections of the X shaped insert 526 serving the horizontal wave power system 520 opens into a large circular cistern 578 which spans most of the center cylinder 501 at that point and surrounds the sump 527. The floor of the cistern 578 is higher in the middle under the drain 525 and slants down towards the periphery. About half way from the drain 525 to the periphery the floor drops off and forms a circular series of catch basins 579, one for each of the pouches 543 in the horizontal wave power system 520, with a drain 580 in the floor of each catch basin 579. As shown in FIG. 35, the hose 552 runs from each catch basin drain 580 to its pouch 543 where there is a flapper or other type valve 551 which regulates the flow of water or fluid 504 into the pouch 543. When the pouch 543 is full the valve 581 closes and the fluid 504 backs up in the hose 552 and into the catch basin 579. As shown in FIG. 35 and FIG. 38, running around the very outer periphery of the cistern 578 slightly below the level of the top of the outer wall 582 of the catch basins 579, which is lower than the inner wall 583, there is a trough 584 to collect the overflow from a catch basin 579. There are also holes 585 between the trough 584 and each catch basin 579 to permit fluid 504 to run from the trough 584 back into the catch basin 579, with a flapper or other valve on the catch basin 579 side of the hole 585 to prevent the fluid 504 from entering the trough 584 that way. The purpose of the cistern 578, catch basin 579 and trough 584 system is to deliver fluid 504 to whichever pouches 543 in the horizontal wave power system 520 need fluid at any given time.

As shown in FIG. 38, the cistern 578 in the horizontal drainage and distribution system under the X insert, since it opens to only two quarters, or half, of a circle, may not distribute fluid 504 equally to all of the catch basins 579 encircling it. The catch basins 579 in line with the sump 527 serving the vertical wave power system are likely to receive less of the fluid 504 running off from the cistern 578 than those directly in line with the openings to the cistern 578. To reduce this inequality somewhat there are ridges 593 built into the floor of the cistern 578 to divert some of the fluid flowing down from the top of the cistern 578 to the side to the catch basins 579 in line with the sump 527. Another way to equalize the flow of fluid to the catch basins 579 would be to have the X insert 526 and the sides of the sump 527 rotate continuously so as to deliver the fluid more evenly around the circle of catch basins. The floor 529 of the sump 527 would have to be stationary because of the drains 509a and 509b which run down from it, but since the area above the floor 529 is open the sides of the sump could rotate and still deliver the same amount of fluid to the vertical drains 509a and 509b. A motor would be required to rotate the drain 526 and the sides of the sump 527, but if the auxiliary generators could produce enough power to run such a motor, or if such power could be diverted from the main generator, it would be advantageous to the invention.

Generator and Other Systems

The main generator 524 in the fourth embodiment is a conventional generator such as a hydropower generator or a wind generator modified so as to be water cooled, as in the first embodiment. No claims are made regarding the main generator itself, the invention being the design of a system for transferring the energy of ocean waves to turn the shaft of a modified conventional generator.

The electrical transmission system and the anchoring system in the fourth embodiment are comparable to the electrical transmission system 64 and the anchoring system 80 in the first embodiment, taking into account the change from a sphere to a cylinder and other differences.

Dimensions

The discussion in Paragraphs 0050 through 0053 concerning the sphere in the first embodiment is equally applicable to the center cylinder in the fourth embodiment. That is, regarding its dimensions, the concepts of the size of the unit depending upon the size of the waves, how the height of ocean waves is measured, the importance of average significant wave height, the outer limit of the diameter of a unit being a wavelength, and wavelength in meters being roughly proportional to wave period in seconds squared, are all concepts equally applicable to the center cylinder in the fourth embodiment. In addition, the discussion in Paragraphs 0054 through 0056 concerning the need for an inner and outer shell for the sphere is equally applicable to the center cylinder.

It will be important for a wave powered generator to be sized so as to operate as much of the time as possible. Since the measurements of significant wave height and wavelength are based on averages at a given spot in the ocean, and the outer limit of the diameter of the center cylinder is a wavelength, it might be prudent to adopt a rule of thumb that the diameter of a center cylinder should be, for example, approximately half the annual average wavelength at a given spot in the ocean. With the outer limit at a wavelength, it is likely that the generator in a center cylinder with a diameter of half a wavelength will be operable the great majority of the time.

Applying such a rule of thumb, if the average annual wave period in a location were 5 seconds, for example, the average annual wavelength would be approximately 25 meters. At 3.25 feet per meter the average annual wavelength would be over 80 feet, half of which would be about 40 feet, a sufficient diameter for a center cylinder. As indicated in paragraph 0124 above, the shape of the center cylinder in the fourth embodiment is proposed to be block-like, with its height approximately equal to its diameter. One reason for this shape is to stabilize the center cylinder, that is, to minimize the roll of the center cylinder in the waves. Minimizing the roll will facilitate the up and down movement of the piston in the pressure chamber—riding up and down on the shafts of the long drain pipe and cable run, the piston will move more easily in the vertical plane than it will if the center cylinder deviates very far from the vertical plane. Likewise, minimizing the roll of the center cylinder will minimize the side to side sloshing of fluid in the cistern supplying fluid to the pouches in the horizontal wave power system. Experience may show that a rule of thumb for the diameter of the center cylinder of 60% or 70% of the wavelength at a given location will be feasible, but 50% would appear to be a safe place to start.

Variations of the Fourth Embodiment

As described above and as shown in FIGS. 34 and 37, neither auxiliary generator 511 will operate continuously, but the two auxiliary turbines in drainpipes 509*a* and 509*b* will activate their auxiliary generators alternately, with the fluid 504 running down from the sump 527 and turning the auxiliary turbine 531 in first one of the drainpipes and then the other as the fluid 504 is returned to the pressure chamber 503 alternately above and below the piston 505. A variation in the design of the sump 527 and drainpipes 509*a* and 509*b*, however, would result in one auxiliary generator operating continuously and the other operating half of the time, a combination which might be more advantageous.

Figure 39:
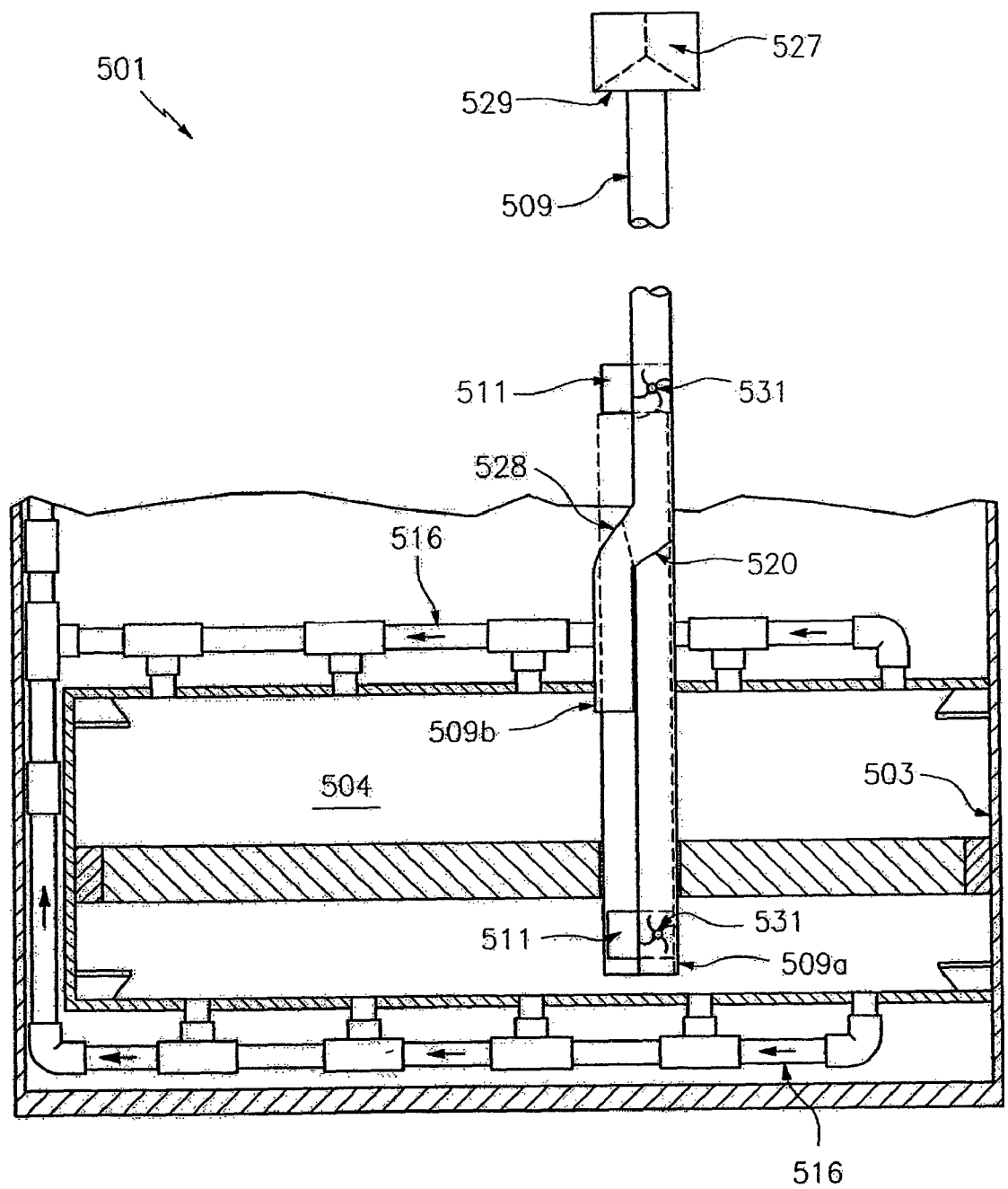
FIG. 39 is a drawing showing a variation of the drainage system for the vertical wave energy system in which instead of there being two drainpipes running down from the sump there is only one, which permits the installation of one auxiliary turbine and auxiliary generator set which will run continuously and another set which will run half of the time, rather than two sets of auxiliary turbines and auxiliary generators which run alternately.

As shown in FIG. 39, the variation in the design of the sump 527 would be simply to have one drain 509 in the floor 529 of the sump 527, which drain 509 would remain open at all times and permit all of the fluid 504 entering the two "vertical" parts of the X insert 526 above the sump 527 to run down into the drain 509. The single drainpipe 509 under the sump 527 would run down through the horizontal wave power system 540 to a short distance above the top of the pressure chamber 503 where an auxiliary turbine 531 would be located in the drainpipe 509, with an auxiliary generator 511 adjoining the auxiliary turbine 531. This auxiliary turbine 531 would receive a continuous flow of fluid 504 down the drainpipe 509, which would cause its adjoining auxiliary generator 511 to operate continuously.

Beneath the auxiliary turbine 531 in the drainpipe 509 near the top of the pressure chamber 503 there would be a Y valve 528 which would split the drainpipe 509 into two pipes equal in diameter to drainpipe 509, one a short drainpipe 509*b* which would discharge fluid 504 into the top of the pressure chamber 503, and the other a long drainpipe 509*a* which would run down through the pressure chamber 503 and through the piston 505 to the bottom of the pressure chamber 503 where it would discharge fluid 504 into the bottom of the pressure chamber 503. A valve 520 connected mechanically or electronically to the piston 505 would be located in the Y valve 528 and would direct the fluid 504 falling from the auxiliary turbine 531 to either drainpipe 509*a* or 509*b*, depending upon whether the piston 505 was rising or falling, and would close off the other drainpipe. A second auxiliary turbine 531 would be located in drainpipe 509*a* near its end at the bottom of the pressure chamber 503, with an auxiliary generator 511 in the adjoining cablerun 510. This auxiliary turbine and generator would be activated any time there was fluid 504 running to the bottom of the pressure chamber 503, which would happen approximately half of the time.

The power generators of the foregoing embodiments provide wave powered commercial electrical generators which maximize current output due to wave motion.

Further, the power generators of the foregoing embodiments provide wave powered commercial generators which can be constructed in various sizes to correspond to the variations in average wave height and wavelength in different parts of the ocean.

Yet further, the power generators of the foregoing embodiments provide wave powered commercial generators which are simple in design, shaped to minimize storm damage, and easy and inexpensive to construct.

Still further, the power generators of the foregoing embodiments provide wave powered commercial generators which will occupy only a small area of the ocean surface and will be visually unobtrusive when viewed from shore.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims:

What is claimed is:

1. A wave powered electrical generator, comprising:

a first floating unit adapted to float in water and accommodate a power generator therein;

a second floating unit adapted to float in the water in the vicinity of the first floating unit; and a spring line, one end of which being attached to the second floating unit and the other end of which being operatively connected to a wave power system provided in the first floating unit for rotating the power generator, wherein the wave power system includes, a telescoping pouch that accommodates the fluid therein;

a supply valve for allowing the fluid into the pouch as a volume of the telescoping pouch increases, and a discharge valve for allowing the fluid to discharge from the pouch into the pipe as the volume decreases, and a pivotable platform that supports the telescoping pouch and connected to the other end of the spring line, such that a relative movement between the first floating unit and the second floating unit causes the spring line to pivot the platform to increase and decrease the volume of the telescoping pouch.

2. The wave powered electrical generator according to claim 1, wherein the second floating unit has a mast extending upward from the top thereof, wherein, one end of the spring line is attached to the mast, such that the spring line is exposed above the water.

* * * * *